US011933042B2

(12) United States Patent
Pilz

(10) Patent No.: US 11,933,042 B2
(45) Date of Patent: *Mar. 19, 2024

(54) MECHANICALLY FASTENED FIRESTOP FLUTE PLUG

(71) Applicant: CEMCO, LLC, City of Industry, CA (US)

(72) Inventor: Donald Anthony Pilz, Livermore, CA (US)

(73) Assignee: CEMCO, LLC, City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,158

(22) Filed: Nov. 1, 2021

(65) Prior Publication Data

US 2022/0162851 A1 May 26, 2022

Related U.S. Application Data

(63) Continuation of application No. 16/398,144, filed on Apr. 29, 2019, now Pat. No. 11,162,259.

(60) Provisional application No. 62/664,832, filed on Apr. 30, 2018.

(51) Int. Cl.
*E04B 1/94* (2006.01)
*A62C 2/06* (2006.01)

(52) U.S. Cl.
CPC ................ *E04B 1/948* (2013.01); *A62C 2/06* (2013.01); *E04B 1/941* (2013.01)

(58) Field of Classification Search
CPC ...... E04B 2/7411; E04B 2/7457; E04B 1/948; E04B 1/947; E04B 1/944; E04B 1/941; A62C 2/06
See application file for complete search history.

(56) References Cited

U.S. PATENT DOCUMENTS 661,832 A 11/1900 Wilkinson
716,628 A 12/1902 Dickey
965,595 A 7/1910 Nicholson
(Continued)

FOREIGN PATENT DOCUMENTS

CA 2234347 10/1999
CA 2498537 A1 8/2006
(Continued)

OTHER PUBLICATIONS

U.S. Appl. No. 17/303,173, filed May 21, 2021, Pilz et al.
(Continued)

*Primary Examiner* — Brian D Mattei
*Assistant Examiner* — Joseph J. Sadlon
(74) *Attorney, Agent, or Firm* — Knobbe, Martens, Olson & Bear LLP

(57) ABSTRACT

An improved flute plug for a head-of-wall assembly for fire rated wall construction beneath a fluted deck or ceiling. The improved flute plug can be friction fit within individual flute voids that run over the top of the header track. The improved flute plug can include a single piece pre-bent steel profile with fire stopping material attached thereto or contained therein. The fire stopping material can be oversized so that it will compress into the flute void over the top of the header track. The compressed fire stopping material can provide a seal against fire, smoke and/or noise through the fluted deck voids.

17 Claims, 7 Drawing Sheets

(56) References Cited

U.S. PATENT DOCUMENTS

| | | | | | |
|---|---|---|---|---|---|
| 1,130,722 | A | | 3/1915 | Fletcher | |
| 1,563,651 | A | | 12/1925 | Pomerantz | |
| 1,719,728 | A | | 7/1929 | Saunders | |
| 2,020,576 | A | | 11/1935 | Runde | |
| 2,105,771 | A | | 1/1938 | Holdsworth | |
| 2,114,386 | A | | 4/1938 | Killion | |
| 2,218,426 | A | | 10/1940 | Hulbert, Jr. | |
| 2,556,878 | A | | 6/1951 | Kohlhaas | |
| 2,664,739 | A | | 1/1954 | Marcy | |
| 2,683,927 | A | | 7/1954 | Maronek | |
| 2,688,927 | A | | 9/1954 | Nuebling | |
| 2,733,786 | A | | 2/1956 | Drake | |
| 2,766,855 | A | * | 10/1956 | Johnson | E04B 2/76 52/290 |
| 2,994,114 | A | | 8/1961 | Black | |
| 3,041,682 | A | | 7/1962 | Alderfer et al. | |
| 3,129,792 | A | | 4/1964 | Gwynne | |
| 3,153,467 | A | | 10/1964 | Nelsson et al. | |
| 3,271,920 | A | | 9/1966 | Downing, Jr. | |
| 3,286,420 | A | * | 11/1966 | Hiram | E04B 2/82 52/775 |
| 3,309,826 | A | | 3/1967 | Zinn | |
| 3,324,615 | A | | 6/1967 | Zinn | |
| 3,346,909 | A | | 10/1967 | Blackburn | |
| 3,355,852 | A | | 12/1967 | Lally | |
| 3,397,495 | A | | 8/1968 | Thompson | |
| 3,460,302 | A | | 8/1969 | Cooper | |
| 3,481,090 | A | | 12/1969 | Joseph | |
| 3,493,460 | A | | 2/1970 | Windecker | |
| 3,495,417 | A | | 2/1970 | Ratliff | |
| 3,537,219 | A | | 11/1970 | Navarre | |
| 3,562,985 | A | | 2/1971 | Nicosia | |
| 3,566,559 | A | | 3/1971 | Dickson | |
| 3,600,854 | A | | 8/1971 | Dallaire et al. | |
| 3,604,167 | A | | 9/1971 | Hays | |
| 3,609,933 | A | | 10/1971 | Jahn et al. | |
| 3,648,419 | A | | 3/1972 | Marks | |
| 3,668,041 | A | | 6/1972 | Lonning | |
| 3,683,569 | A | | 8/1972 | Holm | |
| 3,696,569 | A | | 10/1972 | Didry | |
| 3,707,819 | A | | 1/1973 | Calhoun et al. | |
| 3,713,263 | A | | 1/1973 | Mullen | |
| 3,730,477 | A | | 5/1973 | Wavrunek | |
| 3,744,199 | A | | 7/1973 | Navarre | |
| 3,757,480 | A | | 9/1973 | Young | |
| 3,786,604 | A | | 1/1974 | Kramer | |
| 3,837,126 | A | | 9/1974 | Voiturier et al. | |
| 3,839,839 | A | | 10/1974 | Tillisch et al. | |
| 3,866,370 | A | | 2/1975 | Guarino et al. | |
| 3,908,328 | A | | 9/1975 | Nelsson | |
| 3,921,346 | A | | 11/1975 | Sauer et al. | |
| 3,922,830 | A | | 12/1975 | Guarino et al. | |
| 3,934,066 | A | | 1/1976 | Murch | |
| 3,935,681 | A | | 2/1976 | Voiturier et al. | |
| 3,955,330 | A | | 5/1976 | Wendt | |
| 3,964,214 | A | | 6/1976 | Wendt | |
| 3,974,607 | A | | 8/1976 | Balinski | |
| 3,976,825 | A | | 8/1976 | Anderberg | |
| 3,998,027 | A | | 12/1976 | Wendt et al. | |
| 4,011,704 | A | | 3/1977 | O'Konski | |
| 4,017,090 | A | | 4/1977 | Cohen | |
| 4,093,818 | A | * | 6/1978 | Thwaites | F16L 5/04 428/116 |
| 4,103,463 | A | | 8/1978 | Dixon | |
| 4,122,203 | A | | 10/1978 | Stahl | |
| 4,130,972 | A | | 12/1978 | Varlonga | |
| 4,139,664 | A | | 2/1979 | Wenrick | |
| 4,144,335 | A | | 3/1979 | Edwards | |
| 4,144,385 | A | | 3/1979 | Downing | |
| 4,152,878 | A | | 5/1979 | Balinski | |
| 4,164,107 | A | | 8/1979 | Kraemling et al. | |
| 4,178,728 | A | | 12/1979 | Ortmanns et al. | |
| 4,197,687 | A | | 4/1980 | Benoit | |
| 4,203,264 | A | | 5/1980 | Kiefer et al. | |
| 4,205,498 | A | | 6/1980 | Unayama | |
| 4,217,731 | A | | 8/1980 | Saino | |
| 4,269,890 | A | | 5/1981 | Breitling et al. | |
| 4,276,332 | A | | 6/1981 | Castle | |
| 4,281,494 | A | | 8/1981 | Weinar | |
| 4,283,892 | A | | 8/1981 | Brown | |
| 4,295,304 | A | | 10/1981 | Kim | |
| 4,318,253 | A | | 3/1982 | Wedel | |
| 4,324,835 | A | | 4/1982 | Keen | |
| 4,329,820 | A | | 5/1982 | Wendt | |
| 4,356,672 | A | | 11/1982 | Beckman et al. | |
| 4,361,994 | A | | 12/1982 | Carver | |
| 4,424,653 | A | | 1/1984 | Heinen | |
| 4,433,732 | A | | 2/1984 | Licht et al. | |
| 4,434,592 | A | | 3/1984 | Reneault et al. | |
| 4,437,274 | A | | 3/1984 | Slocum et al. | |
| 4,454,690 | A | | 6/1984 | Dixon | |
| 4,461,120 | A | | 7/1984 | Hemmerling | |
| 4,467,578 | A | | 8/1984 | Weinar | |
| 4,480,419 | A | | 11/1984 | Crites | |
| 4,495,238 | A | | 1/1985 | Adiletta | |
| 4,497,150 | A | | 2/1985 | Wendt et al. | |
| 4,507,901 | A | | 4/1985 | Carroll | |
| 4,509,559 | A | | 4/1985 | Cheetham et al. | |
| 4,517,782 | A | | 5/1985 | Shamszadeh | |
| 4,574,454 | A | | 3/1986 | Dyson | |
| 4,575,979 | A | | 3/1986 | Mariani | |
| 4,578,913 | A | | 4/1986 | Eich | |
| 4,598,516 | A | | 7/1986 | Groshong | |
| 4,622,791 | A | | 11/1986 | Cook et al. | |
| 4,622,794 | A | | 11/1986 | Geortner | |
| 4,632,865 | A | | 12/1986 | Tzur | |
| 4,649,089 | A | | 3/1987 | Thwaites | |
| 4,663,204 | A | | 5/1987 | Langham | |
| 4,672,785 | A | | 6/1987 | Salvo | |
| 4,709,517 | A | | 12/1987 | Mitchell et al. | |
| 4,711,183 | A | | 12/1987 | Handler et al. | |
| 4,723,385 | A | | 2/1988 | Kallstrom | |
| 4,756,945 | A | | 7/1988 | Gibb | |
| 4,761,927 | A | | 8/1988 | O'Keeffe et al. | |
| 4,787,767 | A | | 11/1988 | Wendt | |
| 4,798,035 | A | | 1/1989 | Mitchell et al. | |
| 4,805,364 | A | | 2/1989 | Smolik | |
| 4,810,986 | A | | 3/1989 | Leupold | |
| 4,822,659 | A | | 4/1989 | Anderson et al. | |
| 4,825,610 | A | | 5/1989 | Gasteiger | |
| 4,830,913 | A | | 5/1989 | Ortmans et al. | |
| 4,845,904 | A | | 7/1989 | Menchetti | |
| 4,850,173 | A | | 7/1989 | Beyer et al. | |
| 4,850,385 | A | | 7/1989 | Harbeke | |
| 4,854,096 | A | | 8/1989 | Smolik | |
| 4,854,107 | A | | 8/1989 | Roberts | |
| 4,866,898 | A | | 9/1989 | LaRoche et al. | |
| 4,881,352 | A | | 11/1989 | Glockenstein | |
| 4,885,884 | A | | 12/1989 | Schilger | |
| 4,897,976 | A | | 2/1990 | Williams et al. | |
| 4,899,510 | A | | 2/1990 | Propst | |
| 4,914,880 | A | | 4/1990 | Albertini | |
| 4,918,761 | A | | 4/1990 | Harbeke | |
| 4,930,276 | A | | 6/1990 | Bawa et al. | |
| 4,935,281 | A | | 6/1990 | Tolbert et al. | |
| 4,982,540 | A | | 1/1991 | Thompson | |
| 4,986,040 | A | | 1/1991 | Prewer et al. | |
| 4,987,719 | A | | 1/1991 | Goodson, Jr. | |
| 4,992,310 | A | | 2/1991 | Gelb et al. | |
| 5,010,702 | A | | 4/1991 | Daw et al. | |
| 5,058,342 | A | | 10/1991 | Crompton | |
| 5,090,170 | A | | 2/1992 | Propst | |
| 5,094,780 | A | | 3/1992 | von Bonin | |
| 5,103,589 | A | | 4/1992 | Crawford | |
| 5,105,594 | A | | 4/1992 | Kirchner | |
| 5,111,579 | A | | 5/1992 | Andersen | |
| 5,125,203 | A | | 6/1992 | Daw | |
| 5,127,203 | A | | 7/1992 | Paquette | |
| 5,127,760 | A | | 7/1992 | Brady | |
| 5,140,792 | A | | 8/1992 | Daw et al. | |
| 5,146,723 | A | | 9/1992 | Greenwood et al. | |
| 5,152,113 | A | | 10/1992 | Guddas | |
| 5,155,957 | A | | 10/1992 | Robertson et al. | |
| 5,157,883 | A | | 10/1992 | Meyer | |

(56) References Cited

U.S. PATENT DOCUMENTS

| | | | |
|---|---|---|---|
| 5,157,887 | A | 10/1992 | Watterworth, III |
| 5,167,876 | A | 12/1992 | Lem |
| 5,173,515 | A | 12/1992 | von Bonin et al. |
| 5,203,132 | A | 4/1993 | Smolik |
| 5,205,099 | A | 4/1993 | Grünhage et al. |
| 5,212,914 | A | 5/1993 | Martin et al. |
| 5,214,894 | A | 6/1993 | Glesser-Lott |
| 5,222,335 | A | 6/1993 | Petrecca |
| 5,228,254 | A | 7/1993 | Honeycutt, Jr. |
| 5,244,709 | A | 9/1993 | Vanderstukken |
| 5,279,087 | A | 1/1994 | Mann |
| 5,279,088 | A | 1/1994 | Heydon |
| 5,279,091 | A | 1/1994 | Williams et al. |
| 5,282,615 | A | 2/1994 | Green et al. |
| 5,285,615 | A | 2/1994 | Gilmour |
| 5,307,600 | A | 5/1994 | Simon et al. |
| 5,315,804 | A | 5/1994 | Attalla |
| 5,319,339 | A | 6/1994 | Leupold |
| 5,325,651 | A | 7/1994 | Meyer et al. |
| 5,339,577 | A | 8/1994 | Snyder |
| 5,347,780 | A | 9/1994 | Richards et al. |
| 5,367,850 | A | 11/1994 | Nicholas |
| 5,374,036 | A | 12/1994 | Rogers et al. |
| 5,376,429 | A | 12/1994 | McGroarty |
| 5,390,458 | A | 2/1995 | Menchetti |
| 5,390,465 | A | 2/1995 | Rajecki |
| 5,394,665 | A | 3/1995 | Johnson |
| 5,412,919 | A | 5/1995 | Pellock et al. |
| 5,433,991 | A | 7/1995 | Boyd, Jr. et al. |
| 5,452,551 | A | 9/1995 | Charland et al. |
| 5,454,203 | A | 10/1995 | Turner |
| 5,456,050 | A | 10/1995 | Ward |
| 5,460,864 | A | 10/1995 | Heitkamp |
| 5,471,791 | A | 12/1995 | Keller |
| 5,471,805 | A | 12/1995 | Becker |
| 5,475,961 | A | 12/1995 | Menchetti |
| 5,477,652 | A | 12/1995 | Torrey et al. |
| 5,502,937 | A | 4/1996 | Wilson |
| 5,505,031 | A | 4/1996 | Heydon |
| 5,531,051 | A | 7/1996 | Chenier, Jr. et al. |
| 5,552,185 | A | 9/1996 | De Keyser |
| 5,592,796 | A | 1/1997 | Landers |
| 5,604,024 | A | 2/1997 | von Bonin |
| 5,607,758 | A | 3/1997 | Schwartz |
| 5,644,877 | A | 7/1997 | Wood |
| 5,687,538 | A | 11/1997 | Frobosilo et al. |
| 5,689,922 | A | 11/1997 | Daudet |
| 5,694,726 | A | 12/1997 | Wu |
| 5,709,821 | A | 1/1998 | von Bonin et al. |
| 5,724,784 | A | 3/1998 | Menchetti |
| 5,735,100 | A | 4/1998 | Campbell |
| 5,740,635 | A | 4/1998 | Gil et al. |
| 5,740,643 | A | 4/1998 | Huntley |
| 5,755,066 | A | 5/1998 | Becker |
| 5,765,332 | A | 6/1998 | Landin et al. |
| 5,787,651 | A | 8/1998 | Horn et al. |
| 5,797,233 | A | 8/1998 | Hascall |
| 5,798,679 | A | 8/1998 | Pissanetzky |
| 5,806,261 | A | 9/1998 | Huebner et al. |
| 5,820,958 | A | 10/1998 | Swallow |
| 5,822,935 | A | 10/1998 | Mitchell et al. |
| 5,870,866 | A | 2/1999 | Herndon |
| 5,913,788 | A | 6/1999 | Herren |
| 5,921,041 | A | 7/1999 | Egri, II |
| 5,927,041 | A | 7/1999 | Sedlmeier et al. |
| 5,930,963 | A | 8/1999 | Nichols |
| 5,930,968 | A | 8/1999 | Pullman |
| 5,945,182 | A | 8/1999 | Fowler et al. |
| 5,950,385 | A | 9/1999 | Herren |
| 5,968,615 | A | 10/1999 | Schlappa |
| 5,968,669 | A | 10/1999 | Liu et al. |
| 5,970,672 | A | 10/1999 | Robinson |
| 5,974,750 | A | 11/1999 | Landin et al. |
| 5,974,753 | A | 11/1999 | Hsu |
| 6,023,898 | A | 2/2000 | Josey |
| 6,058,668 | A | 5/2000 | Herren |
| 6,061,985 | A | 5/2000 | Kraus et al. |
| 6,110,559 | A | 8/2000 | De Keyser |
| 6,116,404 | A | 9/2000 | Heuft et al. |
| 6,119,411 | A | 9/2000 | Mateu Gil et al. |
| 6,128,874 | A | 10/2000 | Olson et al. |
| 6,128,877 | A | 10/2000 | Goodman et al. |
| 6,131,352 | A | 10/2000 | Barnes et al. |
| 6,151,858 | A | 11/2000 | Ruiz et al. |
| 6,153,668 | A | 11/2000 | Gestner et al. |
| 6,176,053 | B1 | 1/2001 | St. Germain |
| 6,182,407 | B1 | 2/2001 | Turpin et al. |
| 6,189,277 | B1 | 2/2001 | Boscamp |
| 6,207,077 | B1 | 3/2001 | Burnell-Jones |
| 6,207,085 | B1 | 3/2001 | Ackerman |
| 6,213,679 | B1 | 4/2001 | Frobosilo et al. |
| 6,216,404 | B1 | 4/2001 | Vellrath |
| 6,233,888 | B1 | 5/2001 | Wu |
| 6,256,948 | B1 | 7/2001 | Van Dreumel |
| 6,256,960 | B1 | 7/2001 | Babcock et al. |
| 6,256,980 | B1 | 7/2001 | Lecordix et al. |
| 6,279,289 | B1 | 8/2001 | Soder et al. |
| 6,305,133 | B1 | 10/2001 | Cornwall |
| 6,318,044 | B1 | 11/2001 | Campbell |
| 6,374,558 | B1 | 4/2002 | Surowiecki |
| 6,381,913 | B2 | 5/2002 | Herren |
| 6,405,502 | B1 | 6/2002 | Cornwall |
| 6,408,578 | B1 | 6/2002 | Tanaka et al. |
| 6,430,881 | B1 | 8/2002 | Daudet et al. |
| 6,470,638 | B1 | 10/2002 | Larson |
| 6,487,825 | B1 | 12/2002 | Silik |
| 6,574,930 | B2 | 6/2003 | Kiser |
| 6,595,383 | B2 | 7/2003 | Pietrantoni |
| 6,606,831 | B2 | 8/2003 | Degelsegger |
| 6,647,691 | B2 | 11/2003 | Becker et al. |
| 6,668,499 | B2 | 12/2003 | Degelsegger |
| 6,679,015 | B1 | 1/2004 | Cornwall |
| 6,688,056 | B2 | 2/2004 | von Hoyningen Huene et al. |
| 6,688,499 | B2 | 2/2004 | Zhang |
| 6,698,146 | B2 | 3/2004 | Morgan et al. |
| 6,705,047 | B2 | 3/2004 | Yulkowski |
| 6,708,627 | B1 | 3/2004 | Wood |
| 6,711,871 | B2 | 3/2004 | Beirise et al. |
| 6,732,481 | B2 | 5/2004 | Stahl, Sr. |
| 6,739,926 | B2 | 5/2004 | Riach et al. |
| 6,748,705 | B2 | 6/2004 | Orszulak |
| 6,783,345 | B2 | 8/2004 | Morgan et al. |
| 6,792,733 | B2 | 9/2004 | Wheeler et al. |
| 6,799,404 | B2 | 10/2004 | Spransy |
| 6,843,035 | B1 | 1/2005 | Glynn |
| 6,854,237 | B2 | 2/2005 | Surowiecki |
| 6,871,470 | B1 | 3/2005 | Stover |
| 6,944,997 | B2 | 9/2005 | Verkamp |
| 6,951,162 | B1 | 10/2005 | Shockey et al. |
| 6,996,944 | B2 | 2/2006 | Shaw |
| 7,043,880 | B2 | 5/2006 | Morgan et al. |
| 7,059,092 | B2 | 6/2006 | Harkins et al. |
| 7,104,024 | B1 | 9/2006 | deGirolamo et al. |
| 7,152,385 | B2 | 12/2006 | Morgan et al. |
| 7,191,845 | B2 | 3/2007 | Loar |
| 7,240,905 | B1 | 7/2007 | Stahl |
| 7,251,918 | B2 | 8/2007 | Reif et al. |
| 7,284,355 | B2 | 10/2007 | Becker et al. |
| 7,302,776 | B2 | 12/2007 | Duncan et al. |
| 7,398,856 | B2 | 7/2008 | Foster et al. |
| 7,413,024 | B1 | 8/2008 | Simontacchi et al. |
| 7,441,565 | B2 | 10/2008 | Imamura et al. |
| 7,487,591 | B2 | 2/2009 | Harkins et al. |
| 7,497,056 | B2 | 3/2009 | Surowiecki |
| 7,506,478 | B2 | 3/2009 | Bobenhausen |
| 7,513,082 | B2 | 4/2009 | Johnson |
| 7,540,118 | B2 | 6/2009 | Jensen |
| 7,594,331 | B2 | 9/2009 | Andrews et al. |
| 7,603,823 | B2 | 10/2009 | Cann |
| 7,610,725 | B2 | 11/2009 | Willert |
| 7,617,643 | B2 | 11/2009 | Pilz et al. |
| 7,681,365 | B2 | 3/2010 | Klein |
| 7,685,792 | B2 | 3/2010 | Stahl, Sr. et al. |
| 7,716,891 | B2 | 5/2010 | Radford |

(56) References Cited

U.S. PATENT DOCUMENTS

| | | | | |
|---|---|---|---|---|
| 7,735,295 | B2 | 6/2010 | Surowiecki | |
| 7,752,817 | B2 | 7/2010 | Pilz et al. | |
| 7,770,348 | B2 | 8/2010 | Tollenaar | |
| 7,775,006 | B2 | 8/2010 | Giannos | |
| 7,776,170 | B2 | 8/2010 | Yu et al. | |
| 7,797,893 | B2 | 9/2010 | Stahl, Sr. et al. | |
| 7,810,295 | B2 | 10/2010 | Thompson | |
| 7,814,718 | B2 | 10/2010 | Klein | |
| 7,827,738 | B2 | 11/2010 | Abrams et al. | |
| 7,836,652 | B2 | 11/2010 | Futterman | |
| 7,866,108 | B2 | 1/2011 | Klein | |
| 7,870,698 | B2 | 1/2011 | Tonyan et al. | |
| 7,921,537 | B2 | 4/2011 | Rodlin | |
| 7,921,614 | B2 | 4/2011 | Fortin et al. | |
| 7,941,981 | B2 | 5/2011 | Shaw | |
| 7,950,198 | B2 | 5/2011 | Pilz et al. | |
| 7,966,778 | B2 * | 6/2011 | Klein | E04B 2/825 52/167.1 |
| 7,984,592 | B1 | 7/2011 | Jiras | |
| 8,029,345 | B2 | 10/2011 | Messmer et al. | |
| 8,056,293 | B2 | 11/2011 | Klein | |
| 8,061,099 | B2 | 11/2011 | Andrews | |
| 8,062,108 | B2 | 11/2011 | Carlson et al. | |
| 8,069,625 | B2 | 12/2011 | Harkins et al. | |
| 8,074,412 | B1 | 12/2011 | Gogan et al. | |
| 8,074,416 | B2 | 12/2011 | Andrews | |
| 8,079,188 | B2 | 12/2011 | Swartz et al. | |
| 8,087,205 | B2 | 1/2012 | Pilz et al. | |
| 8,096,084 | B2 | 1/2012 | Studebaker et al. | |
| 8,100,164 | B2 | 1/2012 | Goodman et al. | |
| 8,132,376 | B2 | 3/2012 | Pilz et al. | |
| 8,136,314 | B2 | 3/2012 | Klein | |
| 8,151,526 | B2 | 4/2012 | Klein | |
| 8,181,404 | B2 | 5/2012 | Klein | |
| 8,225,581 | B2 | 7/2012 | Strickland et al. | |
| 8,281,552 | B2 | 10/2012 | Pilz et al. | |
| 8,286,397 | B2 | 10/2012 | Shaw | |
| 8,318,304 | B2 | 11/2012 | Valenziano | |
| 8,322,094 | B2 | 12/2012 | Pilz et al. | |
| 8,353,139 | B2 | 1/2013 | Pilz | |
| 8,375,666 | B2 | 2/2013 | Stahl, Jr. et al. | |
| 8,389,107 | B2 | 3/2013 | Riebel et al. | |
| 8,413,394 | B2 | 4/2013 | Pilz et al. | |
| 8,468,759 | B2 | 6/2013 | Klein | |
| 8,495,844 | B1 | 7/2013 | Johnson | |
| 8,499,512 | B2 | 8/2013 | Pilz et al. | |
| 8,541,084 | B2 | 9/2013 | Deiss et al. | |
| 8,544,226 | B2 | 10/2013 | Rubel | |
| 8,555,566 | B2 | 10/2013 | Pilz et al. | |
| 8,578,672 | B2 | 11/2013 | Mattox et al. | |
| 8,584,415 | B2 | 11/2013 | Stahl, Jr. et al. | |
| 8,590,231 | B2 | 11/2013 | Pilz | |
| 8,595,999 | B1 | 12/2013 | Pilz et al. | |
| 8,596,019 | B2 | 12/2013 | Aitken | |
| 8,601,760 | B2 | 12/2013 | Hilburn | |
| 8,607,519 | B2 | 12/2013 | Hilburn | |
| 8,640,415 | B2 | 2/2014 | Pilz et al. | |
| 8,646,235 | B2 | 2/2014 | Hilburn, Jr. | |
| 8,671,632 | B2 | 3/2014 | Pilz et al. | |
| 8,728,608 | B2 | 5/2014 | Maisch | |
| 8,782,977 | B2 | 7/2014 | Burgess | |
| 8,793,946 | B2 * | 8/2014 | Stahl, Jr. | E04B 2/96 52/232 |
| 8,793,947 | B2 | 8/2014 | Pilz et al. | |
| 8,826,599 | B2 * | 9/2014 | Stahl, Jr. | E04B 1/84 52/317 |
| 8,871,326 | B2 | 10/2014 | Flennert | |
| 8,938,922 | B2 | 1/2015 | Pilz et al. | |
| 8,950,132 | B2 | 2/2015 | Collins et al. | |
| 8,955,275 | B2 | 2/2015 | Stahl, Jr. | |
| 8,973,319 | B2 | 3/2015 | Pilz et al. | |
| 9,045,899 | B2 | 6/2015 | Pilz et al. | |
| 9,127,454 | B2 | 9/2015 | Pilz et al. | |
| 9,151,042 | B2 | 10/2015 | Simon et al. | |
| 9,157,232 | B2 * | 10/2015 | Stahl, Jr. | E04B 2/7411 |
| 9,163,444 | B1 | 10/2015 | Fontijn et al. | |
| 9,206,596 | B1 | 12/2015 | Robinson | |
| 9,284,730 | B2 | 3/2016 | Klein | |
| 9,290,932 | B2 | 3/2016 | Pilz et al. | |
| 9,290,934 | B2 | 3/2016 | Pilz et al. | |
| 9,316,133 | B2 | 4/2016 | Schnitta | |
| 9,371,644 | B2 | 6/2016 | Pilz et al. | |
| 9,458,628 | B2 | 10/2016 | Pilz et al. | |
| 9,481,998 | B2 | 11/2016 | Pilz et al. | |
| 9,506,246 | B2 | 11/2016 | Joseph et al. | |
| 9,512,614 | B2 | 12/2016 | Klein et al. | |
| 9,523,193 | B2 | 12/2016 | Pilz | |
| 9,551,148 | B2 | 1/2017 | Pilz | |
| 9,616,259 | B2 | 4/2017 | Pilz et al. | |
| 9,637,914 | B2 | 5/2017 | Pilz et al. | |
| 9,683,364 | B2 | 6/2017 | Pilz et al. | |
| 9,719,253 | B2 | 8/2017 | Stahl, Jr. et al. | |
| 9,739,052 | B2 | 8/2017 | Pilz et al. | |
| 9,739,054 | B2 | 8/2017 | Pilz et al. | |
| 9,752,318 | B2 | 9/2017 | Pilz | |
| 9,879,421 | B2 | 1/2018 | Pilz | |
| 9,885,178 | B1 | 2/2018 | Barnes et al. | |
| 9,909,298 | B2 | 3/2018 | Pilz | |
| 9,931,527 | B2 | 4/2018 | Pilz et al. | |
| 9,995,039 | B2 | 6/2018 | Pilz et al. | |
| 9,995,040 | B2 * | 6/2018 | Stahl, Jr. | E04B 2/825 |
| 10,000,923 | B2 | 6/2018 | Pilz | |
| 10,010,805 | B2 | 7/2018 | Maxam et al. | |
| 10,011,983 | B2 | 7/2018 | Pilz et al. | |
| 10,036,155 | B2 * | 7/2018 | Carless | E04C 2/284 |
| 10,077,550 | B2 | 9/2018 | Pilz | |
| 10,166,418 | B2 | 1/2019 | Förg et al. | |
| 10,174,499 | B1 | 1/2019 | Tinianov et al. | |
| 10,184,246 | B2 | 1/2019 | Pilz et al. | |
| 10,214,901 | B2 | 2/2019 | Pilz et al. | |
| 10,227,775 | B2 | 3/2019 | Pilz et al. | |
| 10,246,871 | B2 | 4/2019 | Pilz | |
| 10,323,409 | B1 | 6/2019 | Robinson | |
| 10,323,411 | B2 * | 6/2019 | Ackerman | E04B 1/946 |
| 10,406,389 | B2 | 9/2019 | Pilz et al. | |
| 10,472,819 | B2 | 11/2019 | Klein et al. | |
| 10,494,818 | B2 | 12/2019 | Maziarz | |
| 10,563,399 | B2 | 2/2020 | Pilz et al. | |
| 10,619,347 | B2 | 4/2020 | Pilz et al. | |
| 10,626,598 | B2 | 4/2020 | Klein | |
| 10,669,710 | B2 | 6/2020 | Förg | |
| 10,689,842 | B2 | 6/2020 | Pilz | |
| 10,731,338 | B1 | 8/2020 | Zemler et al. | |
| 10,753,084 | B2 | 8/2020 | Pilz et al. | |
| 10,900,223 | B2 | 1/2021 | Pilz | |
| 10,914,065 | B2 | 2/2021 | Pilz | |
| 10,920,416 | B2 | 2/2021 | Klein et al. | |
| 10,954,670 | B2 | 3/2021 | Pilz | |
| 11,041,306 | B2 | 6/2021 | Pilz et al. | |
| 11,060,283 | B2 | 7/2021 | Pilz et al. | |
| 11,111,666 | B2 | 9/2021 | Pilz | |
| 11,118,346 | B2 | 9/2021 | Klein et al. | |
| 11,141,613 | B2 | 10/2021 | Pilz et al. | |
| 11,149,432 | B2 * | 10/2021 | Gatland | E04B 1/942 |
| 11,162,259 | B2 | 11/2021 | Pilz | |
| 11,230,839 | B2 | 1/2022 | Klein et al. | |
| 11,268,274 | B2 | 3/2022 | Pilz | |
| 11,299,884 | B2 | 4/2022 | Stahl, Jr. et al. | |
| 11,313,121 | B2 | 4/2022 | Quirijns et al. | |
| 11,401,711 | B2 | 8/2022 | Klein | |
| 11,421,417 | B2 | 8/2022 | Pilz et al. | |
| 11,466,449 | B2 | 10/2022 | Pilz et al. | |
| 11,486,150 | B2 | 11/2022 | Stahl et al. | |
| 11,512,464 | B2 | 11/2022 | Klein | |
| 11,560,712 | B2 | 1/2023 | Pilz et al. | |
| 11,674,304 | B2 | 6/2023 | Landreth et al. | |
| 11,697,937 | B2 | 7/2023 | Campbell | |
| 11,773,587 | B2 | 10/2023 | Pilz et al. | |
| 2002/0029535 | A1 | 3/2002 | Loper | |
| 2002/0095908 | A1 | 7/2002 | Kiser | |
| 2002/0160149 | A1 | 10/2002 | Garofalo | |
| 2002/0170249 | A1 | 11/2002 | Yulkowski | |
| 2003/0079425 | A1 | 5/2003 | Morgan et al. | |
| 2003/0089062 | A1 | 5/2003 | Morgan et al. | |

(56) References Cited

U.S. PATENT DOCUMENTS

2003/0196401 A1 10/2003 Surowiecki
2003/0213211 A1 11/2003 Morgan et al.
2004/0010998 A1 1/2004 Turco
2004/0016191 A1 1/2004 Whitty
2004/0045234 A1 3/2004 Morgan et al.
2004/0139684 A1 7/2004 Menendez
2004/0149390 A1 8/2004 Monden et al.
2004/0157012 A1* 8/2004 Miller .................... A62C 2/06 428/34.1
2004/0211150 A1 10/2004 Bobenhausen
2005/0031843 A1 2/2005 Robinson et al.
2005/0183361 A1 8/2005 Frezza
2005/0246973 A1 11/2005 Jensen
2006/0032163 A1 2/2006 Korn
2006/0096200 A1 5/2006 Daudet
2006/0123723 A1 6/2006 Weir et al.
2006/0137293 A1 6/2006 Klein
2006/0213138 A1 9/2006 Milani et al.
2006/0261223 A1 11/2006 Orndorff, II et al.
2006/0277841 A1 12/2006 Majusiak
2007/0056245 A1 3/2007 Edmondson
2007/0068101 A1 3/2007 Weir et al.
2007/0125027 A1 6/2007 Klein
2007/0130873 A1 6/2007 Fisher
2007/0193202 A1 8/2007 Rice
2007/0261343 A1 11/2007 Stahl, Sr.
2008/0053013 A1 3/2008 Tollenaar
2008/0087366 A1 4/2008 Yu et al.
2008/0134589 A1 6/2008 Abrams et al.
2008/0172967 A1 7/2008 Hilburn
2008/0196337 A1 8/2008 Surowiecki
2008/0250738 A1 10/2008 Howchin
2009/0090074 A1 4/2009 Klein
2009/0107064 A1 4/2009 Bowman
2009/0197060 A1 8/2009 Cho
2009/0223159 A1 9/2009 Colon
2009/0282760 A1 11/2009 Sampson et al.
2009/0320392 A1* 12/2009 Nowoczin ................ F16L 5/04 52/220.8
2010/0126092 A1 5/2010 Pilz et al.
2010/0199583 A1 8/2010 Behrens et al.
2010/0266781 A1 10/2010 Kusinski et al.
2011/0011019 A1 1/2011 Stahl, Jr. et al.
2011/0041415 A1 2/2011 Esposito
2011/0056163 A1 3/2011 Kure
2011/0067328 A1 3/2011 Naccarato et al.
2011/0099928 A1 5/2011 Klein et al.
2011/0113709 A1 5/2011 Pilz et al.
2011/0123801 A1 5/2011 Valenciano
2011/0146180 A1 6/2011 Klein
2011/0167742 A1 7/2011 Klein
2011/0185656 A1 8/2011 Klein
2011/0214371 A1 9/2011 Klein
2011/0247281 A1 10/2011 Pilz et al.
2011/0262720 A1 10/2011 Riebel et al.
2011/0274886 A1 11/2011 Flennert
2011/0302857 A1 12/2011 McClellan et al.
2012/0023846 A1 2/2012 Mattox et al.
2012/0180414 A1 7/2012 Burgess
2012/0247038 A1 10/2012 Black
2012/0266550 A1 10/2012 Naccarato et al.
2012/0297710 A1 11/2012 Klein
2013/0031856 A1 2/2013 Pilz et al.
2013/0118102 A1 5/2013 Pilz
2013/0118764 A1 5/2013 Porter
2013/0133844 A1 5/2013 Smart et al.
2013/0205694 A1* 8/2013 Stahl, Jr. .................. E04B 1/84 52/232
2014/0219719 A1 8/2014 Hensley et al.
2014/0260017 A1 9/2014 Noble, III
2014/0345886 A1 11/2014 Yano et al.
2015/0086793 A1 3/2015 Kreysler et al.
2015/0135622 A1 5/2015 Muenzenberger et al.
2015/0135631 A1 5/2015 Förg
2015/0275506 A1 10/2015 Klein et al.
2015/0275507 A1 10/2015 Klein et al.
2015/0275510 A1 10/2015 Klein et al.
2015/0354210 A1 12/2015 Stahl, Jr. et al.
2015/0368898 A1 12/2015 Stahl, Jr. et al.
2016/0016381 A1 1/2016 Celis Marin
2016/0017598 A1 1/2016 Klein et al.
2016/0017599 A1 1/2016 Klein et al.
2016/0097197 A1 4/2016 Pilz
2016/0201893 A1 7/2016 Ksiezppolski
2016/0265219 A1 9/2016 Pilz
2016/0296775 A1 10/2016 Pilz et al.
2016/0348357 A1 12/2016 Smith et al.
2017/0016227 A1 1/2017 Klein
2017/0175386 A1 6/2017 Pilz
2017/0234004 A1 8/2017 Pilz
2017/0234010 A1 8/2017 Klein
2017/0260741 A1 9/2017 Ackerman et al.
2017/0306615 A1 10/2017 Klein et al.
2018/0010333 A1 1/2018 Förg
2018/0044913 A1 2/2018 Klein et al.
2018/0072922 A1 3/2018 Canale
2018/0171624 A1 6/2018 Klein et al.
2018/0171646 A1 6/2018 Stahl et al.
2018/0195282 A1 7/2018 Pilz
2018/0291619 A1 10/2018 Ackerman et al.
2019/0284799 A1 9/2019 Förg
2019/0316350 A1 10/2019 Pilz et al.
2019/0323234 A1 10/2019 Watanabe et al.
2019/0323347 A1 10/2019 Hensley et al.
2020/0199867 A1* 6/2020 Ackerman .............. E04B 1/947
2020/0240140 A1 7/2020 Pilz
2020/0308829 A1 10/2020 Hunsaker
2020/0340239 A1 10/2020 Chang
2020/0340240 A1 10/2020 Pilz
2020/0362551 A1 11/2020 Klein et al.
2021/0017761 A1 1/2021 Klein et al.
2021/0040731 A1 2/2021 Pilz
2021/0062502 A1 3/2021 Archer et al.
2021/0101319 A1 4/2021 Klein et al.
2021/0148112 A1 5/2021 Klein
2021/0164222 A1 6/2021 Pilz
2021/0189721 A1 6/2021 Klein et al.
2021/0285208 A1 9/2021 Pilz
2021/0396004 A1 12/2021 Pilz
2022/0010553 A1 1/2022 Pilz et al.
2022/0023684 A1 1/2022 Pilz et al.
2022/0042303 A1 2/2022 Pilz
2022/0056686 A1 2/2022 Pilz
2022/0098856 A1 3/2022 Pilz
2022/0106785 A1 4/2022 Klein
2022/0154456 A1 5/2022 Griffith et al.
2022/0259852 A1 8/2022 Pilz
2022/0268017 A1 8/2022 Pilz
2022/0349177 A1 11/2022 Pilz
2023/0114420 A1 4/2023 Pilz et al.
2023/0115315 A1 4/2023 Pilz et al.
2023/0203807 A1 6/2023 Pilz et al.

FOREIGN PATENT DOCUMENTS

CA 2711659 2/2012
CA 2803439 3/2017
CA 3010414 8/2017
DE 2645807 B1 3/1978
DE 60213279 T2 7/2007
EP 0 335 347 10/1989
EP 0 346 126 12/1989
EP 0509701 A1 10/1992
EP 3 196 376 7/2017
EP 3 348 729 7/2018
EP 3508662 A1 * 7/2019 ............... E04B 1/66
EP 3556957 A1 * 10/2019 ........... E04B 1/6812
GB 2 159 051 11/1985
GB 2 239 213 A 6/1991
GB 2 411 212 8/2005
GB 2 424 658 10/2006
GB 2 494 721 A 3/2013
JP H06-042090 A 2/1994
JP H06-146433 5/1994

(56) References Cited

FOREIGN PATENT DOCUMENTS

| | | | |
|---|---|---|---|
| JP | H06-220934 | | 8/1994 |
| JP | H07-004620 | U | 1/1995 |
| KR | 100664665 | B1 | 1/2007 |
| WO | WO 2003/038206 | | 5/2003 |
| WO | WO 2004/071584 | | 8/2004 |
| WO | WO 2007/103331 | | 9/2007 |
| WO | WO 2013/113734 | | 8/2013 |
| WO | WO 2017/129398 | | 1/2017 |
| WO | WO 2019/108295 | | 6/2019 |

OTHER PUBLICATIONS

U.S. Appl. No. 17/453,158, filed Nov. 1, 2021, Pilz.
BlazeFrame 2009 catalog of products, available at least as of Mar. 4, 2010 from www.blazeframe.com, in 20 pages.
Catalog page from Stockton Products, printed from www.stocktonproducts.com, on Dec. 16, 2007, showing #5 Drip, in 1 page.
ClarkDietrich Building Systems, Product Submittal Sheet, (FTSC) Flat Trail Vertical Slide Clip. CD-FTSC11 Jul. 2011. 1 page.
Double Track™ information sheets by Dietrich Metal Framing, in 2 pages; accessible on Internet Wayback Machine on Jul. 8, 2006.
FireStik™ by CEMCO Brochure, published on www.firestik.US, in 18 pages; accessible on Internet Wayback Machine on Aug. 13, 2007.
Information Disclosure Statement letter; U.S. Appl. No. 12/196,115, dated Aug. 4, 2011.
International Search Report for Application No. PCT/US2008/073920, dated Apr. 9, 2009.
"Intumescent Expansion Joint Seals", Astroflame; http://www.astroflame.com/intumescent_expansion_joint_seals; Jul. 2011; 4 pages.
James A. Klein's Answer, Affirmative Defenses and Counterclaims to Third Amended Complaint; U.S. District Court, Central District of California; Case No. 2:12-cv-10791-DDP-MRWx; Filed Sep. 17, 14; pp. 1-37.
Letter from Thomas E. Loop; counsel for defendant; Jun. 26, 2015.
Expert Report of James William Jones and exhibits; Case No. CV12-10791 DDP (MRWx); May 18, 2015.
Letter from Ann G. Schoen of Frost Brown Todd, LLC; Jun. 24, 2015.
"System No. HW-D-0607", May 6, 2010, Metacaulk, www.rectorseal.com, www.metacault.com; 2008 Underwriters Laboratories Inc.; 2 pages.
Trim-Tex, Inc., TRIM-TEX Wall Mounted Deflection Bead Installation Instructions, 2 pages. [Undated. Applicant requests that the Examiner review and consider the reference as prior art for the purpose of examination.].
"Wall Mounted Deflection Bead," Trim-Tex Drywall Products; Oct. 9, 2016; 3 pages.
U.S. Appl. No. 17/821,128, filed Aug. 19, 2022, Pilz et al.
U.S. Appl. No. 17/935,291, filed Sep. 26, 2022, Pilz et al.
U.S. Appl. No. 18/150,111, filed Jan. 4, 2023, Pilz et al.

* cited by examiner

MECHANICALLY FASTENED FIRESTOP FLUTE PLUG

RELATED APPLICATION

This application is a continuation of U.S. patent application Ser. No. 16/398,144, filed Apr. 29, 2019, which claims the benefit of U.S. Patent Application No. 62/664,832, filed Apr. 30, 2018, the entirety of which is hereby incorporated by reference.

BACKGROUND

Field

The present disclosure relates to fire-resistant arrangements for building structures. In particular, disclosed arrangements are wall gap fire resistant structures or "fire blocks" that reduce or prevent fire, air, smoke and heat from passing from one side of a wall to the other side through a wall gap.

Related Art

To meet relevant building codes and standards (e.g., UL-2079), a fire block for a head-of-wall assembly must pass both an air leakage test and a hose stream test. A conventional fire block involves a mineral wool or other fire block material positioned within the gaps in the head-of-wall assembly. Once the gaps are filled with the fire block material, a flexible coating, such as an elastomeric coating, can be sprayed on head-of-wall to secure the fire block material in place. This arrangement requires a significant amount of time and expertise to install. In addition, over a period of time, the flexible coating may degrade, resulting in cracks and/or flaking. As a result, it is possible that the fire resistant material may become dislodged from the head-of-wall gaps thereby reducing or eliminating the effectiveness of the fire block.

SUMMARY

An aspect of the present disclosure involves a flute plug assembly or a wall incorporating a flute plug assembly, wherein the flute plug assembly is configured for installation in a single flute of an overhead structure. The flute plug assembly includes a support and a fire-blocking material plug. The support includes an attachment portion and at least one retention portion. The attachment portion is configured to be coupled to a header track and the retention portion is configured to block removal of the fire-blocking material plug from the flute.

In some configurations, at least the support and the fire-blocking material plug of the flute plug assembly are pre-assembled and inserted into the flute as a unit.

In some configurations, the at least one retention portion comprises a first retention portion and a second retention portion positioned on opposing sides of the fire-blocking material plug. In some such configurations, at least one retention portion is unitarily-formed with the attachment portion. In some configurations, the retention portion is constructed in whole or in part from a metal, gypsum board or plastic material.

In some configurations, the flute plug assembly extends only a portion of a length of a fluid void. In some such configurations, a pair of flute plug assemblies are positioned on opposite sides of the wall assembly in opposing ends of the flute void.

In some configurations, a maximum length of the flute plugs is less than the sum of a maximum width of the flute and a distance between flutes. In some such configurations, a maximum length of the flute plug assembly is substantially equal to a maximum width of the flute.

In another aspect, a head-of-wall assembly includes a fluted pan deck including a plurality of flutes aligned along a first direction. A flute of the plurality of flutes defines a concave perimeter and a flute void. A header track couples to the fluted pan deck is aligned along a second direction. The second direction is transverse to the first direction. The header track includes a first leg, a second leg and a web coupling the first and second legs. A plurality of studs couple the header track between the first and second legs. At least one wallboard couples to the plurality of studs. A deflection gap extend across the head-of-wall assembly. A flute plug assembly includes a profile. The profile includes a lower flange. The lower flange couples to a first intermediate flange. The first intermediate flange couples to a front upper flange having a first outer profile. The lower flange couples to a second intermediate flange. The second intermediate flange couples to a rear upper flange having a second outer profile. A fire blocking material has a third outer profile. The fire blocking material is within a slot between the front and rear upper flanges. The flute plug assembly is aligned with the flute void and the lower flange is couples to the header track by a first fastener. The fire blocking material compresses against the concave perimeter of the flute void to seal the head-of-wall assembly against fire, smoke and sound through the flute void.

In another aspect, a head-of-wall assembly includes a fluted pan deck including a plurality of flutes aligned along a first direction. A flute of the plurality of flutes defining a concave perimeter and a flute void. A header track couples to the fluted plan deck. The header track includes a first leg, a second leg, and a web coupling between the first and second legs. A plurality of studs couple within the header track. At least one wallboard couples to the plurality of studs. A flute plug assembly includes a profile. The profile includes a lower flange, an intermediate flange, and an upper flange having a first outer profile. A fire blocking material has a second outer profile. The flute plug assembly is aligned with the flute void and the lower flange is couples to the header track. The fire blocking material contacts the concave perimeter of the flute to seal the flute void against fire, smoke, and sound.

In another aspect, a flute plug assembly for installation within a head-of-wall assembly includes a metal profile. The metal profile includes a lower flange aligned generally vertically. A first intermediate flange aligns generally horizontally. The first intermediate flange couples on a first end with the lower flange. A front upper flange aligns generally vertically and has a first outer profile. The front upper flange couples to a second end of the first intermediate flange. A second intermediate flange aligns generally horizontally and opposite the first intermediate flange. The second intermediate flange couples on a first end with the lower flange. A rear upper flange aligns generally vertically and has a second outer profile. The rear upper flange couples to a second end of the second intermediate flange. A fire blocking material has a third outer profile. The fire blocking material is a slot between the front and rear upper flanges. The flute plug assembly is aligned within a flute void of a fluted ceiling and the fire blocking material compressed against a concave perimeter of the flute void to seal the head-of-wall assembly against fire, smoke and sound through the flute void.

In another aspect, a head-of-wall assembly includes a fluted pan deck including a plurality of flutes aligned along a first direction. A flute of the plurality of flutes defines a concave perimeter and a flute void. A header track couples to the fluted plan deck and aligned along a second direction. The second direction is transverse to the first direction. The header track includes a first leg, a second leg, and a web coupling between the first and second legs. A plurality of studs couple within the header track. At least one wallboard couples to the plurality of studs. A flute plug assembly includes a profile. The profile includes a lower flange. An upper flange has a first outer profile. An intermediate flange couples the lower flange and the upper flange. An fire blocking material has a second outer profile. A first fastener couples the fire blocking material with the upper flange. The flute plug assembly is aligned with the flute and the lower flange couples to the header track by a second fastener. The second outer profile of the fire blocking material contacts the concave perimeter of the flute to seal the flute void against fire, smoke, and sound.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

DETAILED DESCRIPTION

Figure 1:
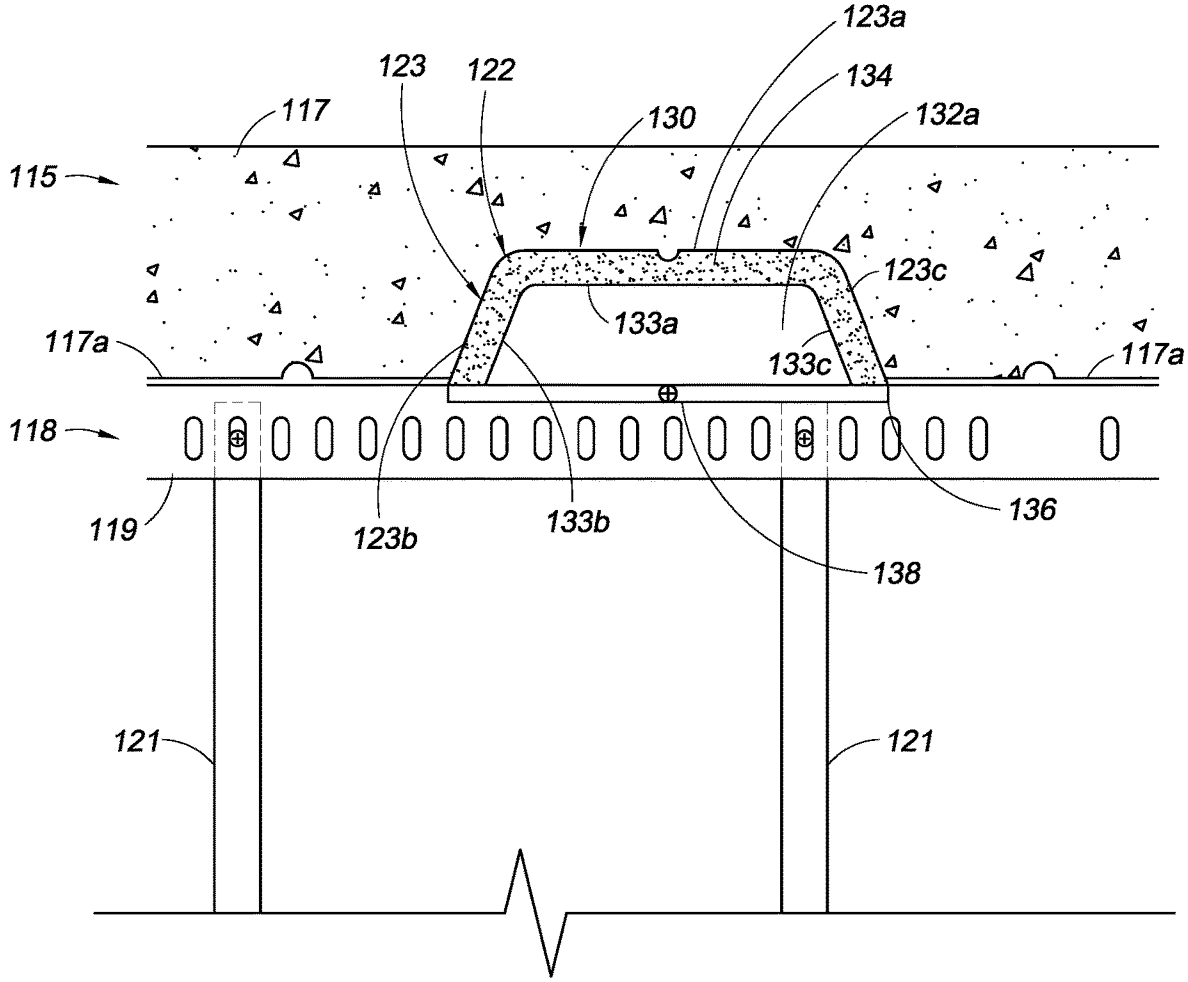
FIG. 1 is an elevation view of a head-of-wall assembly having a flute plug assembly positioned within a head-of-wall gap.

The various features and advantages of the technology described herein will become more fully apparent from the following description of the embodiments illustrated in the figures. These embodiments are intended to illustrate the principles of this disclosure, and this disclosure should not be limited to merely the illustrated examples. The features of the illustrated embodiments can be modified, combined, removed, and/or substituted as will be apparent to those of ordinary skill in the art upon consideration of the principles disclosed herein.

A head-of-wall assembly can be an interface between an upper end of a wall (e.g., an interior wall) and an overhead or horizontal support structure (e.g., a ceiling structure—which may form a floor structure of an adjacent upper floor of the building). A head-of-wall assembly can include a gap that enables relative movement between the ceiling and the upper end of the wall. As described above, the head-of-wall assembly must be fire blocked or sealed against the passage of fire, smoke and/or noise from one side of the wall to the other side. Accordingly various technologies have been developed to provide such a seal that also allow for dynamic movement of the head-of-wall assembly. As one example, the assignee of the present application has developed advanced head-of-wall fire block arrangements sold under the trademark FAS TRACK® and described in U.S. Pat. Nos. 10,184,246 and 10,214,901, among other patents.

In some head-of-wall assemblies, the ceiling is made from a corrugated or fluted pan deck. The fluted pan deck can include a plurality of parallel flutes aligned along one direction. In some cases, an interior wall can extend across the flutes, leaving a flute void in the head-of-wall assembly that must also be sealed. As noted above, the conventional methodology is to fill these flute voids with a compressed mineral fiber and to apply a fire sealant material over the outside of the head-of-wall assembly. This process can be time consuming and may deteriorate over time.

U.S. Pat. No. 6,058,668 to Herren describes an alternative solution to the traditional stuff and seal methodology. In Herren, an angle piece is positioned on each side of a header track of the wall assembly. The angle piece includes a steel tab that can be folded up and positioned within the flute voids. The tabs of the opposing angle pieces cooperate to secure the mineral wool within the flute voids. However, the solution in Herren cannot be used in conjunction with many advanced head-of-wall fire block arrangements. In many advanced head-of-wall fire block arrangements, there must be two surfaces facing each other along which the fire stopping material can be applied. In a typical head-of-wall assembly, one surface can be a top of a wallboard and the second surface can be mineral wool or another material in the head-of-wall assembly that faces the top of the wallboard. However, in the Herren design, the tabs block or fail to provide the second surface to which fire stopping material can be applied. Thus, the Herren design does not provide an adequate seal to prevent fire, smoke and sound without the application of a conventional spray sealant. Accordingly a need exists for an economical and effective head-of-wall assembly including flute voids.

FIG. 1 shows a head-of-wall assembly 115. The head-of-wall assembly 115 can be an interface between an exterior, interior or other type of wall and an overhead structure or ceiling 117. In some implementations, the ceiling 117 can be generally horizontal respect to a ground surface. In one implementation, the ceiling 117 is a corrugated or fluted pan deck. The fluted pan deck can be filled with concrete on an upper side thereof. The corrugations of the pan deck can define a plurality of flutes extending along the ceiling 117. The flutes can extend in the first direction. Each of the flutes can be spaced apart at regular intervals.

The flutes can be separated from each other by a plurality of corresponding lowermost portions 117*a* of the ceiling 117. The lowermost portions 117*a* can comprise planar surfaces. The planar surfaces can be generally horizontal. The lowermost portions 117*a* can be parallel with each other and extend in the first direction.

The head-of-wall assembly 115 can include a header track 118. The header track 118 can be coupled to the ceiling 117. The header track 118 can be coupled to the ceiling 117 by one or more mechanical fasteners, adhesives or other suitable connectors. In one implementation, the header track 118 is coupled to the lowermost portions 117*a*.

The head-of-wall assembly 115 can comprise a plurality of studs 121. The plurality of studs 121 can be coupled to the header track 118. The header track 118 can include a plurality of slots. Each of the studs 121 can connect to the header track 118 through one of the plurality of slots. The slots can enable the studs 121 to move in a linear direction with respect to the header track 118. The linear movement can accommodate movement between the ceiling 117 and the studs 121. The head-of-wall assembly 115 can further include one or more wallboards (not shown) attached with the plurality of studs 121 (not shown) on one or both sides of the wall. As is known it the art, the wall can include a footer track supported by a lower horizontal support structure (e.g., a floor) and lower ends of the studs 121 can be coupled to the footer track.

The head-of-wall assembly 115, including the header track 118, can be angled or aligned with respect to the plurality of flutes depending on a layout of the walls relative to the pan deck. In some cases, the header track 118 can be aligned in a second direction. The second direction can be at an angle between 0° and 180° with respect to the first direction. With the header track 118 aligned transverse to the plurality of flutes, the head-of-wall assembly 118 can include or define a plurality of voids corresponding to the plurality of flutes. To fire block or seal across the head-of-wall assembly, the flute voids can be filled or otherwise sealed, as described below.

The ceiling 117 includes a representative flute void 122. The flute void 122 is defined by a concave perimeter 123. The concave perimeter 123 need not be uniformly concave in all implementations. The concave perimeter 123 can be a generally, upwardly arced profile extending along the flute void 122. The flute void 122 can be located between two lowermost portions 117*a* of the ceiling 117. The concave perimeter 123 can include an upper side 123*a*. The concave perimeter 123 can include first and/or second sides 123*b*, 123*c*. The upper side 123*a* can be generally planar and/or horizontal. The first and/or second sides 123*b*, 123*c* can be angled with respect to the upper side 123*a*. The first and second sides 123*b*, 123*c* can connect between the lowermost portion 117*a* of the ceiling 117 and with the upper side 123*a*.

The head-of-wall assembly 115 can include a flute plug assembly 130. The flute plug assembly 130 is shown, in one implementation, in FIGS. 2 and 3. The flute plug assembly 130 can include a support, such as a frame or profile 131. The profile 131 can be formed of sheet metal or other suitable material (e.g., plastic). The metal can be steel, aluminum, or another suitable metal. The profile 131 can include a plurality of portions. In one implementation, the portions can be flanges. Thus, the term "flange" herein can be replaced with the term "portion." Any one or combination of the flanges can be generally planar. In some configurations, the profile 131 is a single, continuous sheet of metal bent or otherwise shaped into a desired form.

Figure 2:
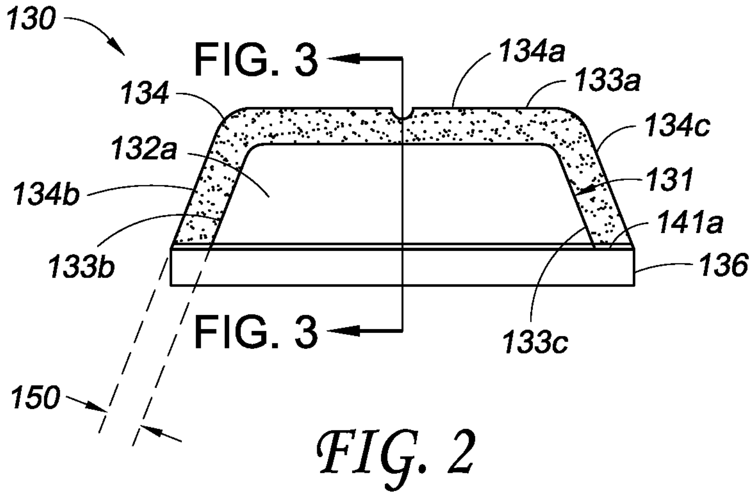
FIG. 2 is a front view of the flute plug assembly of FIG. 1.
Figure 3:
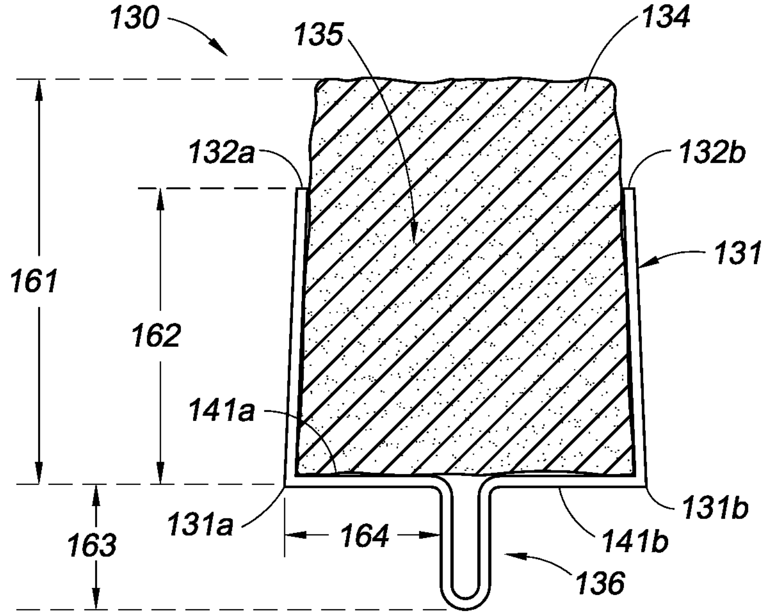
FIG. 3 is a section view of the flute plug assembly taken along the line 3-3 in FIG. 2.

The profile 131 can include a front upper flange 132*a*. The front upper flange 132*a* can extend in a generally upright or vertical orientation. The front upper flange 132*a* can have an outer profile. An example of the outer profile is shown in FIG. 2. The front upper flange 132*a* can include a top 133*a*. The top 133*a* can be generally straight and/or include one or more cutouts portions. The front upper flange 132*a* can include a first side 133*b* and/or a second side 133*c*. The top 133*a* and/or the first and second sides 133*b*, 133*c* can form the outer profile of the front upper flange 132*a*. In one implementation, the outer profile can generally match the concave perimeter 123 of the flute void 122. The outer profile can be generally trapezoidal.

The profile 131 can include an intermediate portion or base, which can be in the form of a flange 141*a*. The intermediate flange 141*a* can couple with the front upper flange 132*a*. The front upper flange 132*a* can connect with the intermediate flange 141*a* at a bend 131*a*. The bend 131*a* can form an angle between the front upper flange 132*a* and the intermediate flange 141*a*. The angle of the bend 131*a* can be between 0 degrees and 180 degrees. In one implementation, the angle is approximately 90 degrees. In another implementation, the angle is between approximately 80 degrees and 100 degrees. The first intermediate flange 141*a* can be generally horizontal in an as-used orientation or when the flute plug assembly 130 is assembled in a head-of-wall assembly 115.

The profile 131 can include an attachment portion, which can be in the form of a lower flange 136. The lower flange 136 can connect with the intermediate flange 141*a* (e.g., at a bend). The lower flange 136 can extend transversely from the intermediate flange 141*a*. In one implementation, the lower flange 136 can be generally vertically (in an as-used orientation) or perpendicular with the intermediate flange 141*a*. In one implementation, the lower flange 136 can comprise a bent region of the profile 131. The material of the profile 131 can be folded back over itself to form a generally flat or planar portion. The lower flange 136 can be generally flat or planar portion. The lower flange 136 can be a doubled layer of the material of the profile 131. The lowest point of the lower flange 136 can be a bend of the profile 131.

The lower flange 136 can connect with a second intermediate flange 141*b*. The second intermediate flange 141*b* can be coupled to the lower flange 136 at a bend. The second intermediate flange 141*b* can be generally perpendicular with the lower flange 136. In the illustrated arrangement, the second intermediate flange 141*b* is aligned with the intermediate flange 141*a*. In an alternative arrangement, the second intermediate flange 141*b* can be offset (e.g., out of alignment) from the intermediate flange 141*a*. The second intermediate flange 141*b* can be generally horizontal.

The second intermediate flange 141*b* can couple with a rear upper flange 132*b*. The rear upper flange 132*b* can extend generally vertically in an as-used orientation or at an angle with respect to the second intermediate flange 141*b*. The rear upper flange 132*b* can connect with the second intermediate flange 141*b* at a bend 131*b*. The rear upper flange 132*b* can be at any suitable angle with respect to the intermediate flange 141*b*. The angle can be any of the angles disclosed above for the angle of the bend 131*a*. The rear upper flange 132*b* can have an outer profile. The outer profile can be similar or identical to the outer profile of the front upper flange 132*a*. The outer profile of the rear upper flange 132*b* can be sized and/or shaped to align with or be offset from the outer profile of the front upper flange 132*a*.

The profile 131 can form an interior space or slot 135. The slot 135 can be located between the front upper flange 132*a* and the rear upper flange 132*b*. The slot 135 can be tapered. The slot 135 can be tapered from an upper end of the slot to a lower end of the slot, either outwardly or inwardly. In the illustrated arrangement, the front and rear upper flanges 132*a*, 132*b* are angled towards each other. In other words, upper ends of the front and rear upper flanges 132*a*, 132*b* are closer to each other than lower ends of the front and rear upper flanges 132*a*, 132*b*.

The flute plug assembly 130 can include a fire blocking material 134. The fire blocking material 134 a mineral wool, fiberglass, compressible intumescent foam, backer rod, or other types of compressible or expanding fire-resistant material. The mineral wool can be stone mineral wool or glass mineral wool, such as that manufactured by ROXUL® Inc., THERMAFIBER® Inc., or any other manufacturer of suitable mineral wool, or other suitable fire block material known in the industry. The fire blocking material 134 can be located within the slot 135. The fire blocking material 134 can be at least somewhat compressed to fit within the slot 135. In some configurations, the fire blocking material 134 can be significantly compressed to fit within the slot 135, i.e., reduced at least about 25% or 30% from an original dimension. In an unassembled state, the fire blocking material 134 can be thicker than a depth of the slot 135 (e.g., at one or more points between the front and rear upper flanges 132*a*, 132*b*). The front and rear upper flanges 132*a*, 132*b* can be biased inwardly to secure the fire blocking material 134 within the slot 135. The fire blocking material 134 can be abutted against the front upper flange 132*a*, the rear upper flange 132*b*, the intermediate flange 141*a*, and/or the second intermediate flange 141*b*.

In certain implementations, the flute plug assembly 130 can include a fastener (e.g., screw, nail, clip or other) to secure the fire blocking material 134 within the slot 135. The fastener (not shown) can extend through one or more of the front upper flange 132*a*, the rear upper flange 132*b* and/or the fire blocking material 134. The fire block material 134 can be pre-assembled with the profile 131.

The fire blocking material 134 can define an outer profile. The outer profile can include a top 134*a*. The top 134*a* can be generally straight and/or include one or more cutout regions or curves. The outer profile can further include a first side 134*b* and/or a second side 134*c*. The first and second sides 134*b*, 134*c* can connect on opposite ends of the top 134*a*. In some implementations, the outer profile of the fire blocking material 134 can generally match the outer profile of the front upper flange 132*a*, the rear upper flange 132*b*, and/or the concave perimeter 123. The outer profile of the fire blocking material 134 can be generally trapezoidal.

An offset or spacing 150 can be defined between the outer profile of the fire blocking material 134 and the outer profile of the front upper flange 132*a* (or rear upper flange 132*b*). In one implementation, the spacing 150 can be uniform across the outer profiles (e.g., between any or all of the respective top, first, and/or second sides of each of the outer profiles). In another implementation, the spacing 150 can vary between any or all of the respective top, first, and/or second sides of each of the outer profiles. The spacing 150 can vary between an installed configuration, where the flute plug assembly is assembled within the flute void 122, and an uninstalled configuration. The spacing 150 can be less in the installed configuration than the uninstalled configuration due to compression. In one implementation, the spacing 150 can be between 0.25 inches and 0.75 inches in either the installed or uninstalled configurations. In other implementations, the spacing 150 can be less or greater than this given range.

The fire blocking material 134 can have a height 161. The height 161 can extend from the top surface 134*a* to a bottom surface thereof (e.g., at the intermediate flanges 141*a, b*). The height 161 can generally be between approximately 1.0 inches and 10.0 inches. In other implementations, the height 161 can be greater or less than this range. The front upper flange 132*a* (and/or rear upper flange 132*b*) can have a height 162. The height 162 can extend from the top surface 133*a* to the intermediate flanges 141*a* (and/or 141*b*). The height 162 can generally be between approximately 1.0 inches and 10.0 inches. In other implementations, the height 162 can be greater or less than this range. The height 162 can be less than the height 161. The lower flange 136 can have a height 163. The height 163 can extend from the intermediate flange 141*a* and/or 141*b* to a lowermost point of the lower flange 136. The height 163 can generally be between approximately 0.5 inches and 6.0 inches. In other implementations, the height 163 can be greater or less than this range. The intermediate flange 141*a* (and/or 141*b*) can have a length 164. The length 164 can extend from the lower flange 136 to the front upper flange 132*a* (or conversely the rear upper flange 132*b*). The length 164 can generally be between approximately 0.25 inches and 2.0 inches. In other implementations, the length 164 can be greater or less than this range.

Figure 4:
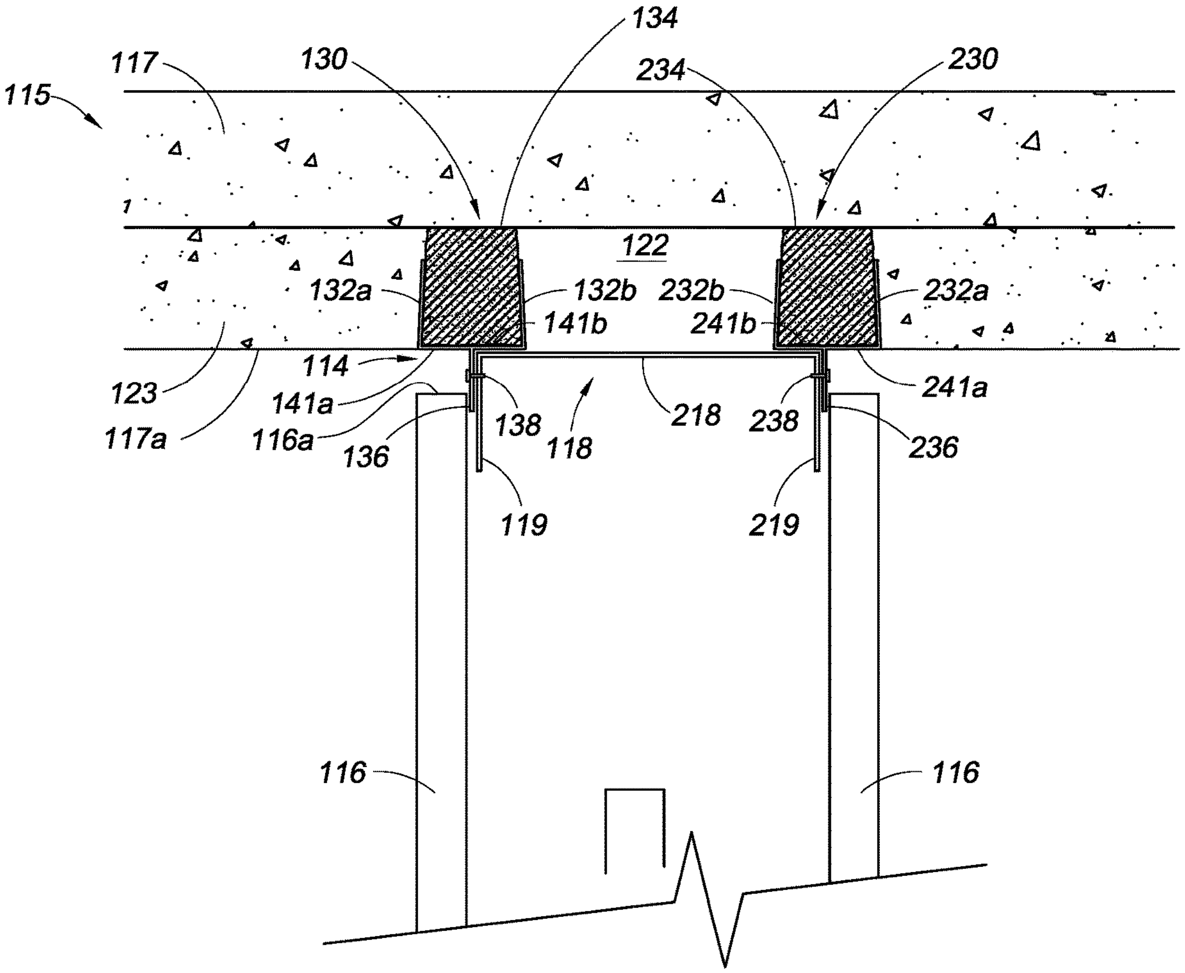
FIG. 4 is an orthogonal section view of the head-of-wall assembly of FIG. 1.

As shown in FIG. 4, the head-of-wall assembly 115 can further include one or more wallboards 116 (e.g., gypsum board or "drywall"). The wallboard 116 can be coupled to the plurality of studs 121. The header track 118 can include a web 218 and first and/or second legs 119, 219. The web 218 can connect the first and second legs 119, 219. The first leg 119 can couple with the web 218 at an orthogonal angle. The second leg 219 can couple with the web 218 at an orthogonal angle. An upper end of each of the plurality of studs 121 can fit between the first and second legs 119, 219. The studs 121 can be coupled to the first and/or second legs 119, 219 through a slot. The connection of the studs 121 with the sides 119/219 can allow motion of the wall relative to the ceiling 117.

The header wall assembly 115 can include a deflection gap 114. The deflection gap 114 can extend between the wallboards 116 and the ceiling 117. For portions of the head-of-wall assembly 115 not aligned with the flute void 122, the deflection gap 114 can extend between an upper surface 116*a* of each of the wallboards and the lowermost portion 117*a* of the ceiling 117. In portions of the head-of-wall assembly 115 that are aligned with the flute void 122, the head-of-wall assembly 115 can include the flute plug assembly 130. The flute plug assembly 130 can at least partially bound the deflection gap 114 across the flute void 122, as describe further below.

The flute plug assembly 130 can be coupled to the header track 118. The lower flange 136 can be coupled to the first leg 119 of the header track 118. The lower flange 136 can alternatively attach with the wallboard 116, the web 218 or another structure in the head-of-wall assembly 115. The lower flange 136 can attach with the header track 118 by one or more mechanical fasteners 138 (e.g. screw, clip, adhesive or similar). The lower flange 136 can include a slot or aperture for coupling with the header track 118 using the fastener 138.

The lower flange 136 can be positioned between the first leg 119 and the wallboard 116. The lower flange 136 can overlap with and/or be in contact with the first leg 119. The second intermediate flange 141*b* can overlap with and/or be in contact with the web 218 of the header track 118. In some implementations the second intermediate flange 141*b* can couple with the header track 118 by one or more fasteners, adhesives or other attachment mechanisms.

In some implementations, the intermediate flange 141*a* can be aligned with the web 218 of the header track 118 and/or the lowermost portion 117*a* of the ceiling 117. In portions of the head-of-wall assembly 115 aligned with the flute void 122, the deflection gap 114 can be defined between the upper surface 116*a* of the wallboard 116 and the intermediate flange 141*a* of the flute plug assembly 130. In some implementations, the intermediate flange 141*a* can extend across the flute void 122 (e.g., from the first side 123*b* to the second side 123*c*). Thus, in some implementations, the intermediate flange 141*a* can fully bound the deflection gap 114 between the upper and lower surfaces. In other implementations, the intermediate flange 141*a* can extend less or more than across the flute void 122. The intermediate flange 141*a* can provide a continuous or semi-continuous upper surface for the deflection gap 114 along a length of the header track 118. The intermediate flange 141*a* can allow for the use of advanced head-of-wall fire block arrangements to seal the head-of-wall assembly 115.

The flute plug assembly 130 can be installed within the flute void 122. At least a portion of the flute plug assembly 130 can extend a length into flute void 122. The fire blocking material 134 can be oversized relative to the concave perimeter 123 of the flute void 122. Installation of the flute plug assembly 130 within the flute void 122 and/or attachment with the header track 118 can engage and/or compress the fire blocking material 134 against the concave perimeter 123 of the flute void 122. In some implementations, the tops 123*a*/134*a*, first sides 123*b*/134*b*, and/or the second sides 123*c*/134*c* can be generally aligned. Engagement of the fire blocking material 134 can seal across the flute void 122.

The front and/or rear upper flanges 132*a*, 132*b* can at least partially maintain the shape of the fire blocking material 134. In some implementations, the tops 123*a*/134*a*/133*a*, first sides 123*b*/134*b*/133*b*, and/or the second sides 123*c*/134*c*/133*c* can be generally aligned. The front and/or rear upper flanges 132*a*, 132*b* can thus increase a compression force between the fire blocking material 134 and the concave perimeter 123 to improve the seal. Moreover, the front and/or rear upper flanges 132*a*, 132*b* can reduce the amount of fire blocking material 134 required to effectively seal the flute void 122 by providing an additional stiffness thereto.

In some implementations, the head-of-wall assembly 115 includes a single fluted plug assembly 130 installed on one side of the head-of-wall assembly 115. This can be adequate for certain situations. In other implementations, a second fluted plug assembly 230 can be included an opposite side of the head-of-wall assembly 115.

The second fluted plug assembly 230 can have a similar or identical structure as the fluted plug assembly 130. The second fluted plug assembly 230 can include a profile 231. The profile 231 can include a lower flange 236, an intermediate flange 241*a*, a second intermediate flange 241*b*, a front flange 232*a*, and/or a rear flange 232*b*. The fluted plug assembly 230 can further include a fire blocking material 234. The fire blocking material 234 can fit within a slot 235 between the front and rear flanges 232*a*, 232*b*. The fire blocking material 234 can be oversized relative to the concave perimeter 123 of the flute void 122. Thus as the second fluted plug assembly 230 is fit within the fluted void 122, the fire blocking material 234 can compress to provide a seal across the flute void 122. The second flute plug assembly 230 can be attached to the header track 118. The lower flange 236 can be attached to the second leg 219 and/or the web 218 or other component of the head-of-wall assembly 115 by a fastener 238.

Figure 5:
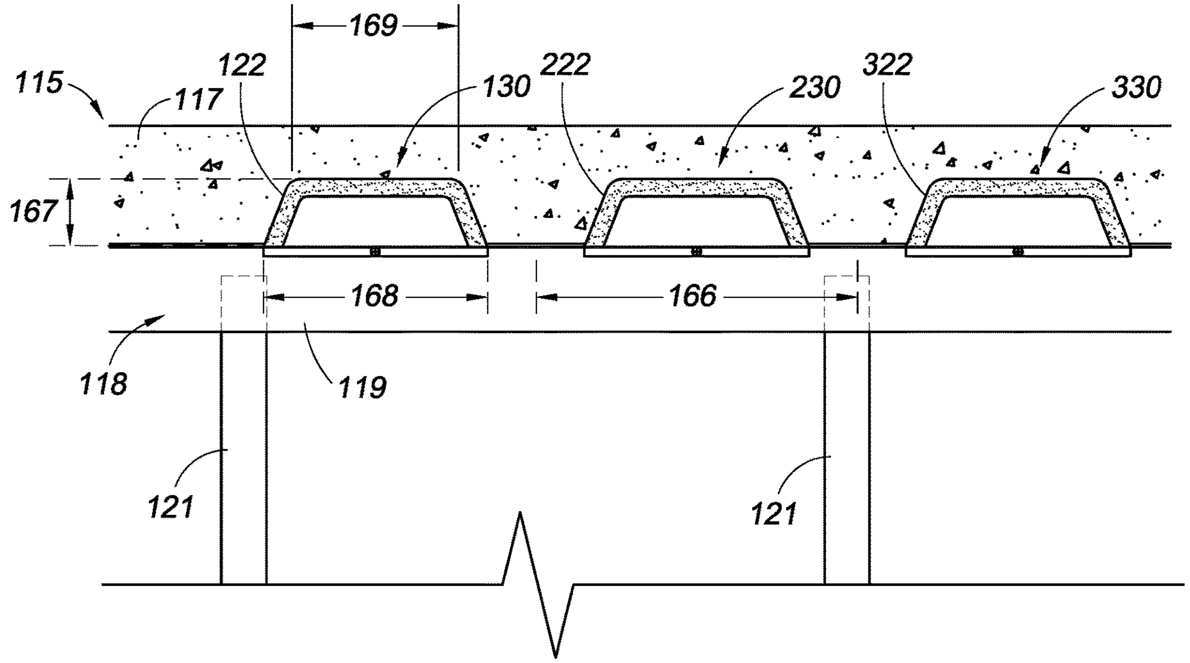
FIG. 5 is an elevation view of a head-of-wall assembly showing three flute plug assemblies.

As shown in FIG. 5, in some implementations, the head-of-wall assembly 115 can include a multiple fluted plug assemblies along a length of the wall. The head of wall assembly 115 can include the second fluted plug assembly 230 within a second flute void 222. The head of wall assembly 115 can include a third fluted plug assembly 330 for sealing a third flute void 322. The fluted plug assembly 330 can be identical or similar to the fluted plug assemblies 130, 230. In an exemplary embodiment, the ceiling 117 can have a pitch 166 of between about 4.0 inches and 8.0 inches. In an exemplary embodiment, the flute void 122 can a depth 167 of between about 1.0 inches and 4.0 inches. In an exemplary embodiment, the flute void 122 can a base width 168 of between about 4.0 inches and 8.0 inches. In an exemplary embodiment, the flute void 122 can a top width 169 of between about 3.0 inches and 7.0 inches. In some configurations, the base width 168 of the flute plug 130 is less than the pitch 166 (e.g., sum of a maximum width of the flute and a distance between flutes). In some configurations, the base width 168 of the flute plug 130 is substantially equal to a maximum width of the flute void 122.

Figure 6:
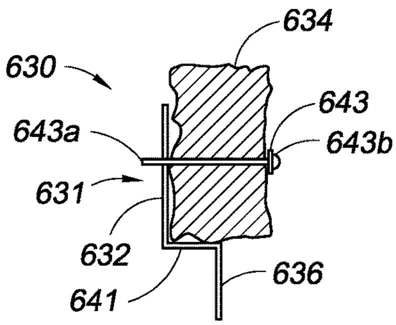
FIG. 6 is a section view of another embodiment of a flute plug assembly.

FIG. 6 shows another embodiment of a flute plug assembly 630. The flute plug assembly 630 can be structurally and functionally similar to the flute plug assembly 130, with differences as noted herein. The flute plug assembly 630 can include a profile 631. The profile 631 can be a sheet of bent metal, such as steel, aluminum or similar. The profile 631 can include a plurality of portion or flanges. The flanges can be generally planar and/or connected by bends in the profile. The profile 631 can include a lower flange 636. The lower flange 636 can be generally vertical. The lower flange 636 can be coupled to an intermediate flange 641. The intermediate flange 641 can be generally horizontal. The intermediate flange 641 can be coupled to an upper flange 632. The upper flange 632 can extend generally vertical.

The profile 631 can be coupled to a fire blocking material 634. The fire blocking material 634 can couple with the upper flange 632. The fire blocking material 634 can be in contact with the upper flange 632 and/or the intermediate flange 641. The flute plug assembly 630 can include a fastener 643. The fastener 643 can attach the fire blocking material 634 with the profile 631. In one implementation, the fastener 643 can be a mechanical fastener, such as a bolt. The fastener 643 can extend through a portion of the fire blocking material 634. An end 643*a* of the fastener 643 can engage within the upper flange 632. In one implementation, the end 643*a* extends into the upper flange 632 or another portion of the flute plug assembly 630. A head 643*b* of the fastener can engage with the fire blocking material 634.

Figure 7:
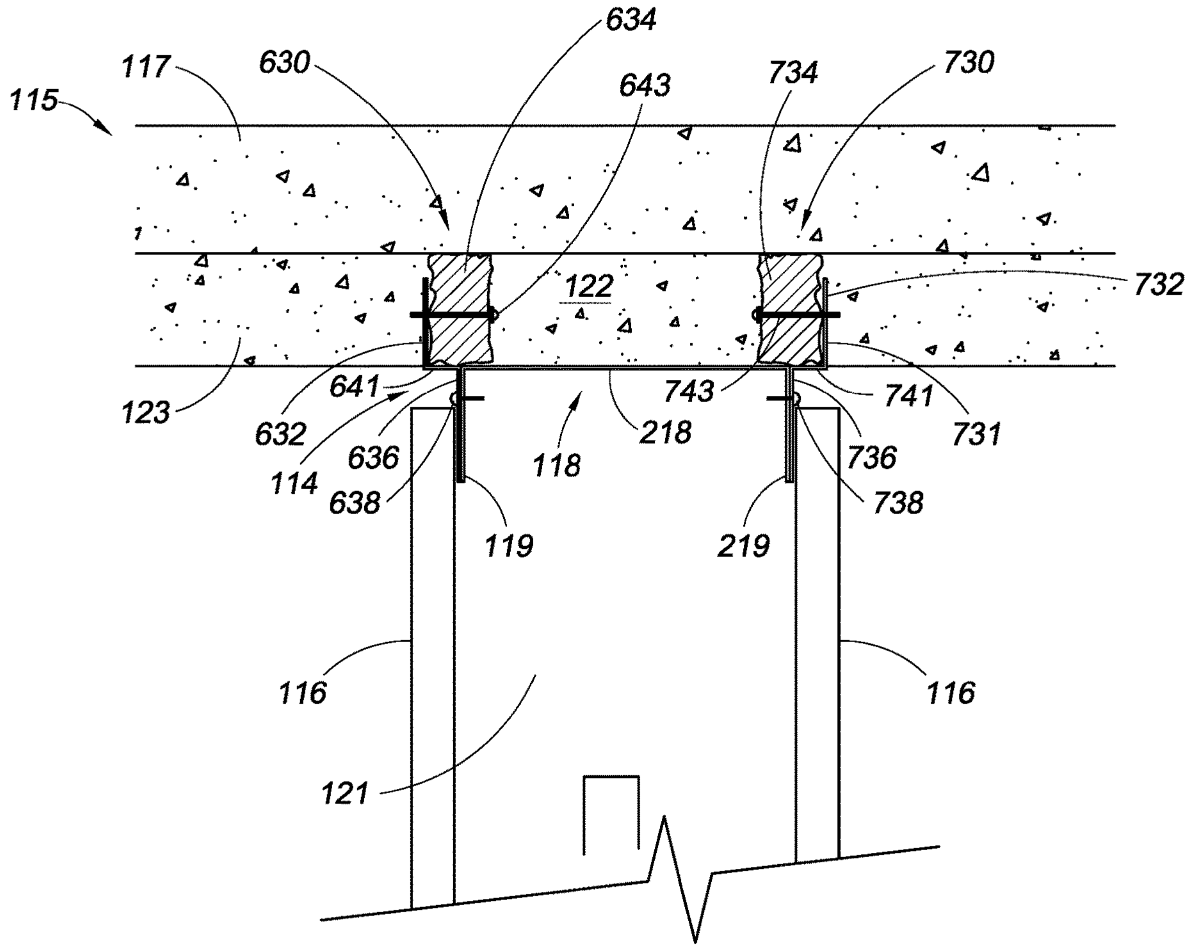
FIG. 7 is an orthogonal section view of a head-of-wall assembly incorporating the flute plug assembly of FIG. 6 on each side of the wall.

FIG. 7 illustrates the flute plug assembly 630 installed within the head-of-wall assembly 115. The lower flange 636 can be coupled to the header track 118. The lower flange 636 can be coupled to the header track 118 by a fastener 638. The lower flange 636 can be attached to the first leg 119 and/or the upper web 218. The lower flange 636 can be aligned with the first leg 119. The lower flange 636 can be located between the wallboard 116 and the first leg 119. The intermediate flange 641 can be aligned with the lower most surface 117*a* of the ceiling 117 and/or the web 218. The intermediate flange 641 can provide a continuous or semi-continuous upper surface across the deflection gap 114.

Similar to the installation of the fluted plug assembly 130, the fire blocking material 634 can be installed within the flute void 122. The fire blocking material 634 can be held in place by the profile 631. In one implementation, the upper flange 632 can face outwardly to the flute void 122. The fire blocking material 634 can be on an inward side of the flute void 122. Alternatively, the upper flange 632 and the fire blocking material 634 orientations can be reversed. The outer profile of the fire blocking material 634 can be compressed against the concave perimeter 123 of the flute void 122. This engagement can provide a seal across the flute void 122. In one implementation, the fire blocking material 634 can overlap and/or contact the web 218. The engagement of the fire blocking material 634 with the web 218 can position the flute plug assembly 630 with the header track 118.

In some implementations, the head-of-wall assembly 115 can further include a second fluted plug 730. The second flute plug assembly 730 can have the same or identical structure as the flute plug 630. The second flute plug 730 can include a fire blocking material 734, a fastener 743, a profile 731, an upper flange 732, an intermediate flange 741 and/or a lower flange 736. The second fluted plug 730 can be installed within a flute void 122. The fire blocking material 734 can face inwardly relative to the interior of the flute void 122. The lower flange 736 can couple with the header track 118, such as at the second leg 219 by a fastener 738.

Figure 8:
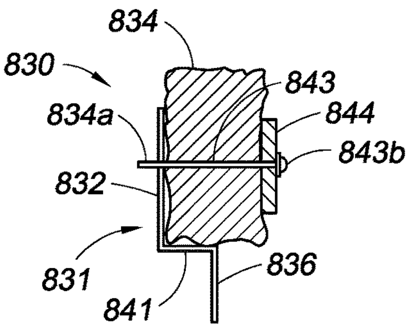
FIG. 8 is a section view of another embodiment of a flute plug assembly.

FIG. 8 shows another embodiment of a flute plug assembly 830. The flute plug assembly 830 can be structurally similar to the flute plug assembly 630, with differences as noted herein. The flute plug assembly 830 can include a profile 831. The profile 831 can be a sheet of bent metal, such as steel, aluminum or similar. The profile 831 can include a plurality of portion or flanges. The flanges can be generally planar and/or connected by bends in the profile. The profile 831 can include a lower flange 836. The lower flange 836 can be generally vertical. The lower flange 836 can be coupled to an intermediate flange 841. The intermediate flange 841 can be generally horizontal. The intermediate flange 841 can be coupled to an upper flange 832. The upper flange 832 can extend generally vertical.

The profile 831 can be coupled to a fire blocking material 834. The fire blocking material 834 can couple with the upper flange 832. The fire blocking material 834 can be in contact with the upper flange 832 and/or the intermediate flange 841. The flute plug assembly 830 can include a fastener 843. The flute plug assembly 830 can include retainer or load-spreading element, such as a washer 844. The washer 844 can be a conventionally shaped washer or planar sheet having a hole therein for receiving the fastener 843. The fastener 843 can attach the washer 844 with the fire blocking material 834 and the profile 831. In one implementation, the fastener 843 can be a mechanical fastener such as a screw, bolt, clip, or similar. The fastener 843 can extend through a portion of the fire blocking material 834. An end 843*a* of the fastener 843 can engage within the profile 831. The second end 843*b* can engage with the washer 844 to distribute a retention force more evenly across or over a larger area of the fire blocking material 834 than without the washer 844.

Figure 9:
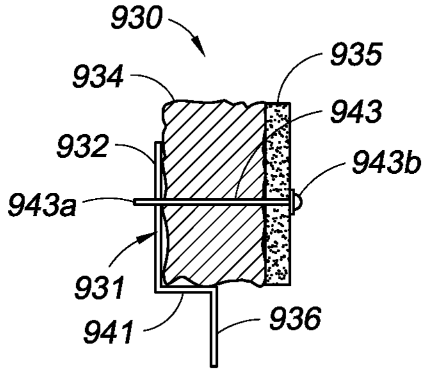
FIG. 9 is a section view of another embodiment of a flute plug assembly.

FIG. 9 illustrates another embodiment of a flute plug assembly 930. The flute plug assembly 930 can be similar or identical to the flute plug assembly 630, except as noted herein. The flute plug assembly 930 can include a profile 931. The profile 931 can be identical to the profile 631. The profile 931 can include a lower flange 936, an intermediate flange 941, and/or an upper flange 932. The flute plug assembly 930 can include a fire blocking material 934. The flute plug assembly 930 can include a fastener 943, such as a bolt. The fastener can include an end 943*a* and a head 943*b*. The fastener 943 can attach with a back stop 935. The back stop 935 can be a generally planar material, which can be separate from the profile 931. The back stop 935 can in some implementations be a piece of gypsum wallboard, wood, plastic or metal. The back stop 935 can be shaped to have an outer profile identical or similar to that of the fire blocking material 934 and/or the upper flange 932. The back stop 935 can include an aperture through which the fastener 943 extends. The back stop 935 can increase the surface area across which a retention force is applied by the fastener 943 to the fire blocking material 934. Accordingly, the back stop 935 can help preserve the shape of the fire blocking material 934 and/or can have the effect of increasing the compression force between the fire blocking material 934 and the outer concave perimeter 123 of the flute void 122.

Figure 10:
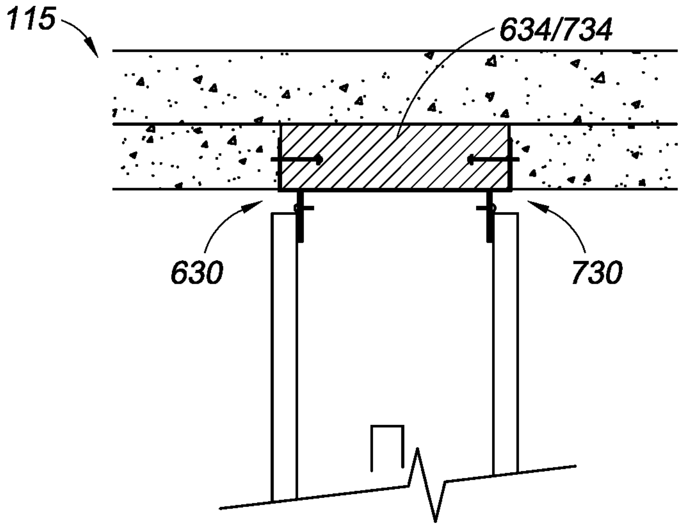
FIG. 10 shows the section assembly of FIG. 8 with an expandable fire blocking material in an expanded state.

FIG. 10 shows an expanded state of the fire blocking material 634 and/or 734. In some implementations, the fire blocking materials 634 and/or 734 can be formed of an intumescent material. The intumescent material expands when heated to a threshold temperature. When exposed to the heat of a fire the fire blocking material 634/734 can expand into the inner portion of the flute void 122. The expanded fire blocking material 634/634 can thus enhance the seal across the head-of-wall assembly 115.

Figure 11:
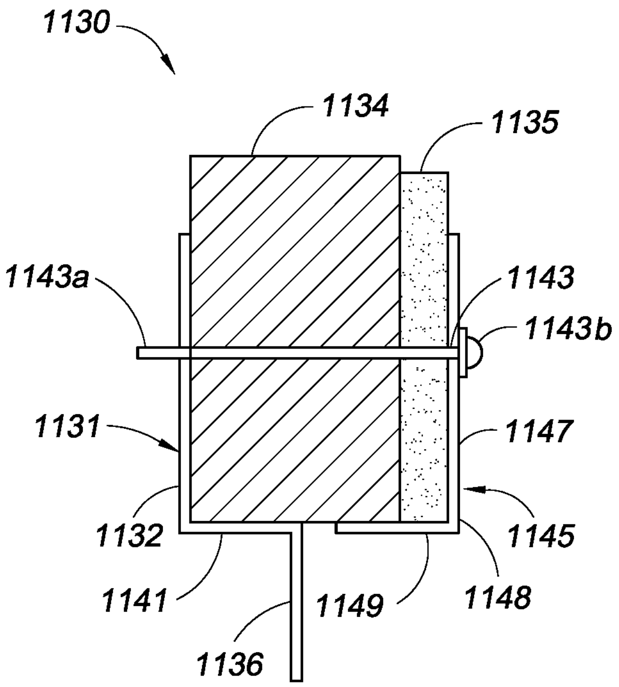
FIG. 11 is a section view of another embodiment of a flute plug assembly.

FIG. 11 illustrates another embodiment of a flute plug assembly 1130. The flute plug assembly 1130 can be similar or identical to the previous flute plug assemblies, except as noted herein. The flute plug assembly 1130 can include a profile 1131. The profile 1131 can be identical to the profile 631. The profile 1131 can include a lower flange 1136, an intermediate flange 1141, and/or an upper flange 1132. The flute plug assembly 1130 can include a fire blocking material 1134. The flute plug assembly 1130 can include a fastener 1143, such as a bolt. The fastener can include an end 1143*a* and a head 1143*b*. In some implementations, the fastener 1143 can attach with an optional back stop 1135. The back stop 1135 can be a generally planar material. The back stop 1135 can in some implementations be a piece of gypsum wallboard, wood, plastic or metal. The back stop 1135 can be shaped to have an outer profile identical or similar to that of the fire blocking material 1134 and/or the upper flange 1132. The back stop 1135 can include an aperture through which the fastener end 1143*a* extends. The fastener head 1143*b* can engage the back stop 1135. The back stop 1135 can increase the surface area for a retention force that is applied by the fastener 1143 to the fire blocking material 1134. Accordingly, the back stop 1135 can help preserve the shape of the fire blocking material 1134 and/or can have the effect of increasing the compression force between the fire blocking material 1134 and the outer concave perimeter 123 of the flute void 122.

The flute plug assembly 1130 can further include an angle 1145. The angle 1145 can be an angled sheet. The sheet can be metal such as steel, aluminum or other material. The angle 1145 can include a first leg 1147 and a second leg 1149. The second leg 1149 can attach with the first leg 1147, optionally at a bend 1148. The bend 1148 can form an angle between the first and second legs 1147, 1149. In some implementations, the angle 1145 can be approximately 90 degrees, although this is not required.

The angle 1145 can include an aperture though which the fastener end 1143*a* extends. The fastener head 1143*b* can engage the angle 1145. The first leg 1147 can overlap the back stop 1135 on one end thereof and/or the fire blocking material 1134 on one end thereof. The second leg 1149 can overlap the back stop 1135 on another end thereof. The angle 1145 can provide additional structural integrity to the shapes of the fire blocking material 1134 and/or the back stop 1135.

The reinforced shape of the fire blocking material 1134 can provide additional stiffness to the fire block material 1134 which can increase the compression force between the concave perimeter 123 of the flute void 122 and the fire block material 1134 to improve the seal.

Certain Terminology

Terms of orientation used herein, such as "top," "bottom," "proximal," "distal," "longitudinal," "lateral," and "end," are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a section region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

All ranges provided herein are inclusive of endpoints.

Summary

Several illustrative embodiments of head of wall assemblies have been disclosed. Although this disclosure has been described in terms of certain illustrative embodiments and uses, other embodiments and other uses, including embodiments and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various embodiments. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one embodiment or example in this disclosure can be combined or used with (or instead of) any other portion of any of the steps, processes, structures, and/or devices disclosed or illustrated in a different embodiment, flowchart, or example. The embodiments and examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative embodiments have been described, any embodiments having equivalent elements, modifications, omissions, and/or combinations are also within the scope of this disclosure. Moreover, although certain aspects, advantages, and novel features are described herein, not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.

Some embodiments have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular embodiment of the inventions disclosed herein. No aspects of this disclosure are essential or indispensable. In many embodiments, the devices, systems, and methods may be configured differently than illustrated in the figures or description herein. For example, various functionalities provided by the illustrated modules can be combined, rearranged, added, or deleted. In some embodiments, additional or different processors or modules may perform some or all of the functionalities described with reference to the example embodiment described and illustrated in the figures. Many implementation variations are possible. Any of the features, structures, steps, or processes disclosed in this specification can be included in any embodiment.

In summary, various embodiments and examples of head of wall assemblies and related methods have been disclosed. This disclosure extends beyond the specifically disclosed embodiments and examples to other alternative embodiments and/or other uses of the embodiments, as well as to certain modifications and equivalents thereof. Moreover, this disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims.

What is claimed is:

1. A head-of-wall assembly comprising:
a fluted pan deck comprising a plurality of flutes aligned along a first direction, a flute of the plurality of flutes defining a concave perimeter and a flute void;
a header track coupled to the fluted pan deck and aligned along a second direction, the second direction being transverse to the first direction, the header track comprising:
a first vertical leg;
a second vertical leg; and
a web extending between the first and second vertical legs and coupling the first and second vertical legs;
a plurality of studs configured to be positioned within and couple with the header track;
at least one wallboard coupled to the plurality of studs; and
a flute plug assembly, comprising:
a frame comprising a first vertical upper flange, a first intermediate horizontal flange connected to the first vertical flange, a first lower vertical flange connected to the first intermediate horizontal flange, a second lower vertical flange connected to the first lower vertical flange, a second intermediate horizontal flange connected to the second lower vertical flange, and a second vertical upper flange connected to the second intermediate horizontal flange such that the first vertical upper flange and the second vertical upper flange are substantially parallel;
a fire blocking material coupled between the vertical upper flanges;
wherein the flute plug assembly contacts the header track and is aligned with the flute void such that the fire blocking material is disposed within the flute void, and one of the vertical lower flanges is aligned along and coupled to the first vertical leg of the header track; and
wherein the fire blocking material contacts the concave perimeter of the flute to limit a passage of one or more of fire, smoke, and sound in the flute void.

2. The head-of-wall assembly of claim 1, further comprising a deflection gap across the head-of-wall assembly.

3. The head-of-wall assembly of claim 1, wherein a length of the fire blocking material along the second direction is longer than a length of the first vertical leg along the second direction.

4. The head-of-wall assembly of claim 1, wherein a length of the fire blocking material along the first direction is at least equal to a sum of a length of the first and second intermediate horizontal flange along the first direction.

5. The head-of-wall assembly of claim 1, wherein the first vertical lower flange is connected to the second vertical lower flange such that it creates an interior space defined by the lower first vertical flange, the second lower vertical flange, and the fire blocking material.

6. The head-of-wall assembly of claim 1, wherein the first upper flange forms a generally trapezoidal outer support having a flat top side and a flat bottom side, wherein the top side of the generally trapezoidal outer support is parallel with the bottom side of the generally trapezoidal outer support.

7. The head-of-wall assembly of claim 1, wherein one of the first intermediate horizontal flange or the second intermediate horizontal flange contacts the web of the header track.

8. The head-of-wall assembly of claim 1, wherein the fire blocking material is compressible and the upper flanges compress the fire blocking material against the concave perimeter.

9. The head-of-wall assembly of claim 1, wherein the frame comprises a sheet of bent steel.

10. The head-of-wall assembly of claim 1, wherein the fire blocking material forms a generally trapezoidal shape along the second direction.

11. The head-of-wall assembly of claim 1, wherein the fire blocking material overlaps the web of the header track.

12. A flute plug assembly configured for installation within a head-of-wall assembly comprising:
a frame, the frame including:
an upright lower flange;
a first intermediate flange oriented horizontally, the first intermediate flange connected on a first end with the lower flange;
an upright front upper flange having a first outer support, the upright front upper flange connected to a second end of the first intermediate flange and extending in a direction opposite the lower flange;
a second intermediate flange oriented horizontally positioned opposite the first intermediate flange, the second intermediate flange connected on a first end with the lower flange;
an upright rear upper flange having a second outer support, the rear upper flange connected to a second end of the second intermediate flange and extending in the direction opposite the lower flange;
a compressible fire blocking material, the fire blocking material at least partially disposed within a slot between the front and rear upper flanges, wherein the fire blocking material is configured to compress against an overhead structure in use to limit a passage of one or more of fire, smoke and sound; and wherein the flute plug assembly is configured to contact a header track.

13. A flute plug assembly of claim 12, wherein the frame comprises a sheet of bent steel.

14. A flute plug assembly of claim 12, wherein the flute plug assembly is configured to be friction fit within a flute void.

15. A flute plug assembly of claim 12, wherein the first outer support forms a generally trapezoidal shape in a first direction.

16. A flute plug assembly of claim 15, wherein the compressible fire blocking material extends passed the first outer support in the first direction.

17. A flute plug assembly of claim 15, wherein the first outer support comprises a planar top surface.

* * * * *